US011674975B2

(12) United States Patent
Takizawa et al.

(10) Patent No.: US 11,674,975 B2
(45) Date of Patent: Jun. 13, 2023

(54) INERTIAL SENSOR, ELECTRONIC APPARATUS, AND VEHICLE

(71) Applicant: Seiko Epson Corporation, Tokyo (JP)

(72) Inventors: Teruo Takizawa, Matsumoto (JP); Kazuyuki Nagata, Minowa (JP); Seiji Yamazaki, Fujimi (JP); Satoru Tanaka, Chino (JP)

(73) Assignee: SEIKO EPSON CORPORATION

( * ) Notice: Subject to any disclaimer, the term of this patent is extended or adjusted under 35 U.S.C. 154(b) by 38 days.

(21) Appl. No.: 17/355,226

(22) Filed: Jun. 23, 2021

(65) Prior Publication Data

US 2021/0405083 A1 Dec. 30, 2021

(30) Foreign Application Priority Data

Jun. 24, 2020 (JP) .............................. JP2020-108576

(51) Int. Cl.
*G01P 15/125* (2006.01)
*G05D 1/02* (2020.01)
*B60W 30/00* (2006.01)
*G01P 15/18* (2013.01)

(52) U.S. Cl.
CPC .......... *G01P 15/125* (2013.01); *B60W 30/00* (2013.01); *G01P 15/18* (2013.01); *G05D 1/027* (2013.01); *B60W 2420/90* (2013.01)

(58) Field of Classification Search
CPC .............................. G01P 15/18; G01P 15/125
See application file for complete search history.

(56) References Cited

U.S. PATENT DOCUMENTS

| 2010/0078740 | A1 | 4/2010 | Cazzaniga et al. |
| 2011/0031959 | A1* | 2/2011 | Konno ................ G01P 15/0802 |
| | | | 324/162 |
| 2015/0241216 | A1 | 8/2015 | Ahtee et al. |
| 2019/0063924 | A1 | 2/2019 | Tanaka |
| 2019/0120872 | A1 | 4/2019 | Geisberger |

FOREIGN PATENT DOCUMENTS

| JP | 2017-509494 A | 4/2017 |
| JP | 2019-045172 A | 3/2019 |

* cited by examiner

*Primary Examiner* — Roy Y Yi
*Assistant Examiner* — Andrew V Do
(74) *Attorney, Agent, or Firm* — Harness, Dickey & Pierce, P.L.C.

(57) ABSTRACT

An inertial sensor includes a substrate, a first supporting beam being a first rotation axis extending along a first direction, a first movable member swingable around the first rotation axis, a second supporting beam being a second rotation axis extending along a second direction crossing the first direction, a second movable member swingable around the second rotation axis, a third rotation axis extending along a second direction, a third movable member swingable around the third rotation axis, and a projection, wherein the second and third movable members are line-symmetrically placed with a center line of the first movable member along the second direction as an axis of symmetry, a center of gravity of the second movable member is closer to the center line than the second supporting beam, and a center of gravity of the third movable member is closer to the center line than the third supporting beam.

7 Claims, 12 Drawing Sheets

INERTIAL SENSOR, ELECTRONIC APPARATUS, AND VEHICLE

The present application is based on, and claims priority from JP Application Serial Number 2020-108576, filed Jun. 24, 2020, the disclosure of which is hereby incorporated by reference herein in its entirety.

BACKGROUND

1. Technical Field

The present disclosure relates to an inertial sensor, an electronic apparatus, and a vehicle.

2. Related Art

Recently, inertial sensors manufactured using MEMS (Micro Electro Mechanical Systems) techniques have been developed. As the inertial sensor, for example, JP-A-2019-45172 discloses a physical quantity sensor having a supporting substrate, a movable member placed on the supporting substrate, having first and second mass members, and seesaw-swinging around a rotation axis, and first and second fixed electrodes provided on the supporting substrate and facing the first and second mass members, and configured to detect an acceleration in vertical directions based on changes in capacitance between the first and second mass members having different rotation moment around the rotation axis of the movable member from each other and the first and second fixed electrodes respectively placed in the facing positions.

Further, in the physical quantity sensor, projections projecting toward the first and second mass members are provided on the supporting substrate to prevent contact of the movable member with the first and second fixed electrodes when the movable member excessively seesaw-swings.

However, when a strong vibration or impact is applied from outside to the inertial sensor disclosed in JP-A-2019-45172, the movable member collides with the projections due to excessive seesaw-swing. The movable member collides with the projections and short-circuit between the first and second fixed electrodes serving as detection electrodes and itself may be avoided, however, if the impact is not absorbable, the movable member and the projections may be broken. That is, when the inertial sensor is subjected to a vibration or impact with certain energy or more, the movable member as a single rigid body may collide with the projections and break the contact members of the movable member and the projections. Further, when the movable member as the single rigid body repeats collision with certain energy, an operation failure due to a sticking phenomenon called stiction may be caused.

SUMMARY

An inertial sensor includes a substrate, a first movable member placed on one surface of the substrate, including a first rotation axis extending along a first direction, and being swingable around the first rotation axis, a first supporting beam supporting the first movable member as the first rotation axis, a second movable member including a second rotation axis extending along a second direction crossing the first direction and being swingable around the second rotation axis, a second supporting beam coupling the first movable member and the second movable member and supporting the second movable member as the second rotation axis, a third movable member including a third rotation axis extending along the second direction crossing the first direction and being swingable around the third rotation axis, a third supporting beam coupling the first movable member and the third movable member and supporting the third movable member as the third rotation axis, and a projection provided on the substrate or the second movable member and the third movable member, overlapping with the second movable member and the third movable member in a plan view from a third direction crossing the first direction and the second direction, and projecting toward the second movable member and the third movable member or the substrate, wherein the second movable member and the third movable member are line-symmetrically placed with respect to a center line of the first movable member along the second direction as an axis of symmetry, a center of gravity of the second movable member is closer to the center line than the second supporting beam, and a center of gravity of the third movable member is closer to the center line than the third supporting beam.

An electronic apparatus includes the above described inertial sensor, and a control unit that performs control based on a detection signal output from the inertial sensor.

A vehicle includes the above described inertial sensor, and a control unit that performs control based on a detection signal output from the inertial sensor.

DESCRIPTION OF EXEMPLARY EMBODIMENTS

1. First Embodiment

An inertial sensor 1 according to embodiment 1 will be explained with reference to FIGS. 1 to 4 with an acceleration sensor detecting an acceleration in vertical direction as an example.

Figure 1:
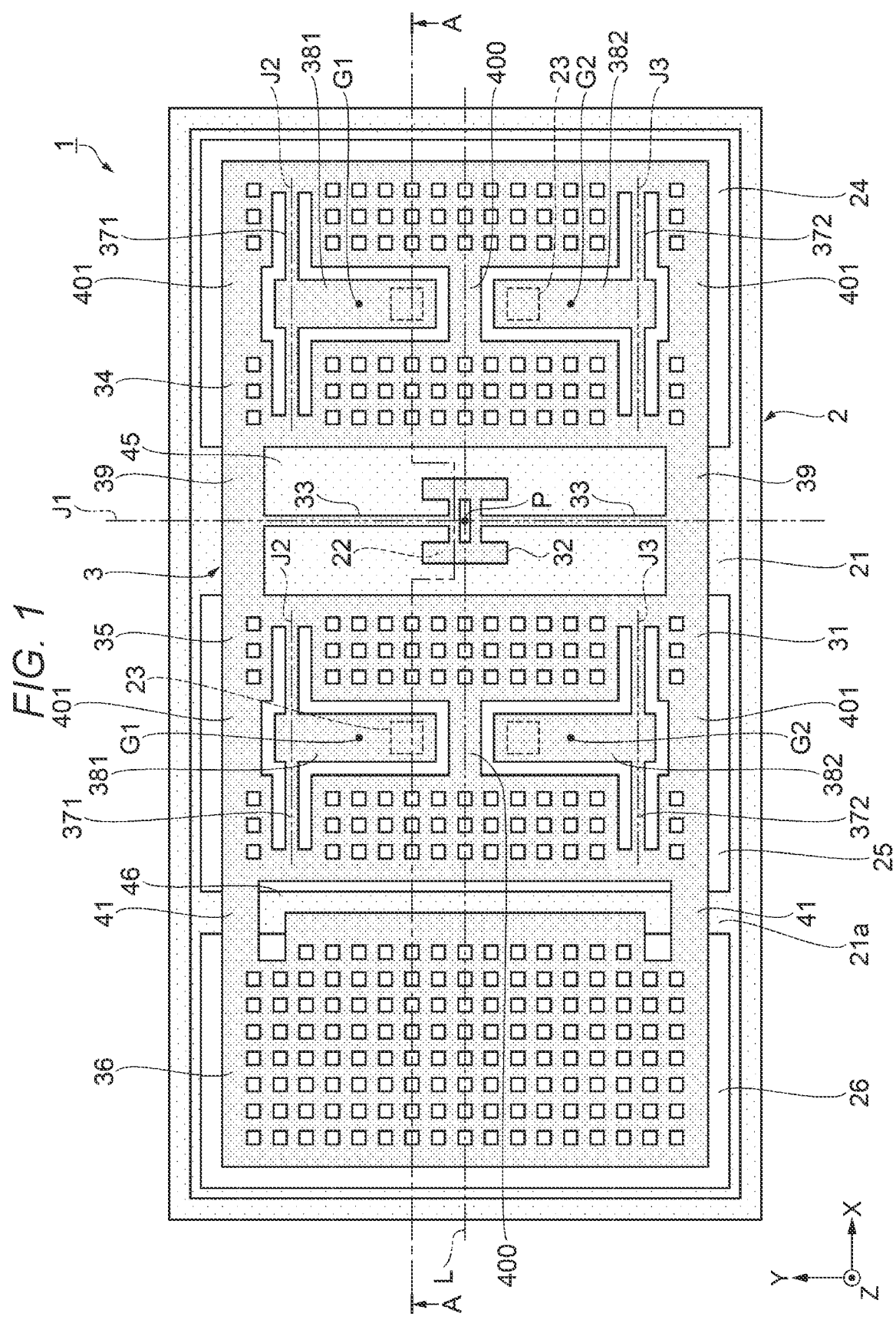
FIG. 1 is a plan view showing a schematic structure of an inertial sensor according to embodiment 1.

Note that, in FIG. 1, for convenience of explanation of the configuration inside of the inertial sensor 1, a state in which a lid 5 is detached is shown. Further, in FIG. 1, wiring of a substrate 2 is omitted.

For convenience of explanation, an X-axis, a Y-axis, and Z-axis are shown as three axes orthogonal to one another in the respective drawings. Further, direction along the X-axis are referred to as "X direction", direction along the Y-axis are referred to as "Y direction", and direction along the Z-axis are referred to as "Z direction". Furthermore, pointer sides of arrows in the respective direction are also referred to as "plus sides", tail sides are also referred to as "minus sides", the plus side in the Z direction is also referred to as "upper", and the minus side in the Z direction is also referred to as "lower". Furthermore, the Z direction is along the vertical direction and an XY-plane is along a horizontal plane. A first direction in the embodiment is the Y direction, a second directions is the X direction, and a third direction is the Z direction.

Figure 2:
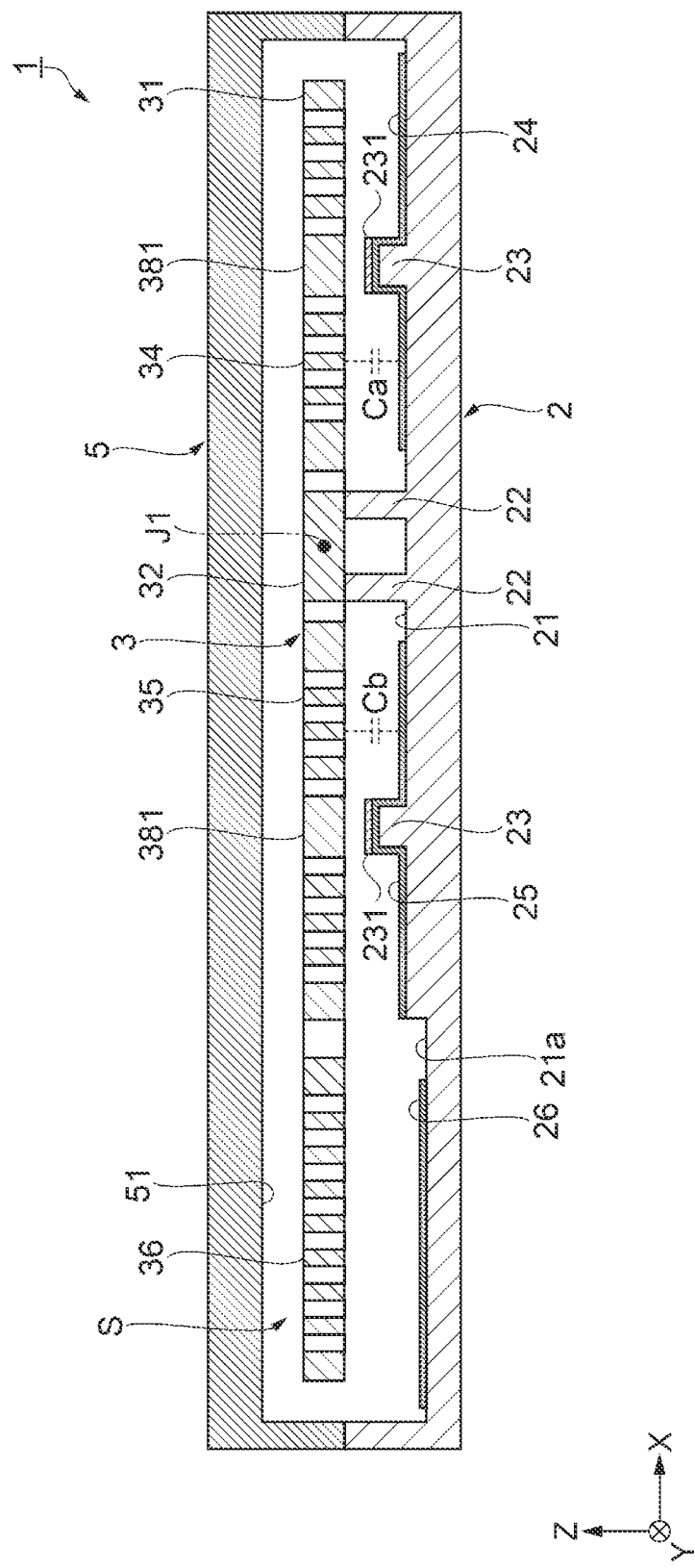
FIG. 2 is a sectional view along line A-A in FIG. 1.

The inertial sensor 1 shown in FIGS. 1 and 2 may detect an acceleration Az in the Z-axis as the vertical direction of a sensor element 3. The inertial sensor 1 has the substrate 2, the sensor element 3 placed on the substrate 2, and the lid 5 bonded to the substrate 2 and covering the sensor element 3.

As shown in FIG. 1, the substrate 2 has a breadth in the X direction and the Y direction and has a thickness in the Z direction. As shown in FIG. 2, the substrate 2 has a first concave portion 21 and a second concave portion 21a opening to an upper surface side. The second concave portion 21a is adjacent at the minus side in the X direction of the first concave portion 21. Further, the bottom surface of the second concave portion 21a is located at the minus side in the Z direction of the bottom surface of the first concave portion 21, i.e., in a position deeper than the bottom surface of the first concave portion 21. The first concave portion 21 and the second concave portion 21a contain the sensor element 3 inside and are formed to be larger than the sensor element 3 in a plan view from the Z direction. The first concave portion 21 and the second concave portion 21a function as a relief portion for suppressing contact between the sensor element 3 and the substrate 2. Furthermore, the substrate 2 has fixing portions 22 and projections 23 projecting from the bottom surface of the first concave portion 21 toward the sensor element 3 side, and a first detection electrode 24 and a second detection electrode 25 are placed on the bottom surface of the first concave portion 21 and a dummy electrode 26 is placed on the bottom surface of the second concave portion 21a. The first detection electrode 24 and the second detection electrode 25 have substantially equal areas. The two different detection electrodes are respectively coupled to a QV amplifier, which will be described later, and a capacitance difference therebetween is detected as an electrical signal by a differential detection method. Therefore, it is desirable that the first detection electrode 24 and the second detection electrode 25 have equal areas. The sensor element 3 is bonded to the upper surfaces of the fixing members 22. The projections 23 are placed in positions overlapping with second movable members 381 and third movable members 382, which will be described later, in the plan view from the Z direction. Note that, in the embodiment, the position of the lower surface of the sensor element 3 placed on the substrate 2 coincides with the bonding surface between the substrate 2 and the lid 5, however, the position is independent of the position relationship with the bonding surface or the shapes of the concave portions as long as the sensor element 3 may be housed in a space surrounded by the substrate 2 and the lid.

The projections 23 function as stoppers that restrict more seesaw-swing of a first movable member 31 by contacting with the second movable members 381 or the third movable members 382 coupled to the first movable member 31 when excessive seesaw-swing is generated in the first movable member 31. The projections 23 are provided, and thereby, excessive proximity between the first movable member 31 and the first detection electrode 24 and second detection electrode 25 at different potentials from each other may be prevented. Generally, an electrostatic attractive force is generated between electrodes at different potentials, and thus, when excessive proximity is caused, the first movable member 31 causes "pull-in" that the first movable member 31 remains attracted to the first detection electrode 24 and second detection electrode 25 and does not return by the electrostatic attractive force generated between the first movable member 31 and the first detection electrode 24 and second detection electrode 25. In this state, the inertial sensor 1 does not normally operates, and it is important to provide the projections 23 to avoid excessive proximity. Note that, as described above, the first movable member 31 and the first detection electrode 24 and second detection electrode have the different potentials, and the projections 23 contain insulating layers 231 to avoid short circuits. As the material of the insulating layers 231, silicon oxide $SiO_2$, silicon nitride $Si_3N_4$, or the like is used.

As the substrate 2, for example, a glass substrate formed using a glass material containing alkali metal ions as mobile ions such as Na+, e.g. borosilicate glass such as Pyrex (registered trademark) glass or TEMPAX (registered trademark) may be used. Note that the substrate 2 is not particularly limited, but e.g. a silicon substrate or a quartz substrate may be used.

As shown in FIG. 1, in the substrate 2, the first detection electrode 24 and the second detection electrode 25 overlapping with the sensor element 3 in the plan view are placed on the bottom surface of the first concave portion 21, and the dummy electrode 26 is placed on the bottom surface of the second concave portion 21a.

As shown in FIG. 2, in the lid 5, a concave portion 51 opening to the lower surface side is formed. The lid 5 houses the sensor element 3 within the concave portion 51 and is bonded to the upper surface of the substrate 2. The lid 5 and the substrate 2 form a housing space S housing the sensor element 3 inside. It is preferable that the housing space S is an airtight space and an inertial gas such as nitrogen, helium, or argon is enclosed therein at the use temperature substantially from −40° C. to 125° C. at nearly the atmospheric pressure. Note that the atmosphere of the housing space S is not particularly limited, but may be depressurized or pressurized.

As the lid 5, e.g. a silicon substrate may be used. Note that, not particularly limited to that, but e.g. a glass substrate or a quartz substrate may be used. The bonding method between the substrate 2 and the lid 5 is not particularly limited, but may be appropriately selected depending on the materials of the substrate 2 and the lid 5. For example, anodic bonding, surface activated bonding for bonding the bonding surfaces activated by plasma radiation, bonding using a bonding material such as glass frit, metal eutectic bonding for bonding metal films deposited on the upper surface of the substrate 2 and the lower surface of the lid 5, or the like may be used.

The sensor element 3 is formed by etching of a conductive silicon substrate doped with an impurity e.g. phosphorus (P), boron (B), or arsenic (As), particularly, perpendicular processing by the Bosh Process as a deep etching technique. As shown in FIG. 1, the sensor element 3 has a holding member 32 bonded to the upper surfaces of the fixing members 22, the first movable member 31 swingable around a rotation axis J1 as a first rotation axis along the Y-axis relative to the holding member 32, first supporting beams 33 coupling the first movable member 31 and the holding member 32 and supporting the first movable member 31 as the first rotation axis, the second movable members 381 swingable around a rotation axis J2 as a second rotation axis along the X-axis, second supporting beams 371 coupling the first movable member and the second movable members 381 arranged in the X direction and supporting the second movable members 381 as the second rotation axis, third movable members 382 swingable around a rotation axis J3 as a third rotation axis along the X-axis, and third supporting beams 372 coupling the first movable member 31 and the third movable members 382 arranged in the X direction and supporting the third movable members 382 as the third rotation axis. For example, the fixing members 22 and the holding member 32 are anodically bonded, and the first supporting beams 33 couple the first movable member 31 and the fixing members 22 via the holding member 32.

The first movable member 31 has a rectangular shape elongated in the X direction in the plan view from the Z direction. Further, the first movable member 31 has a first mass member 34 and a second mass member 35 placed with the rotation axis J1 along the Y-axis in between in the plan view from the Z direction, and a third mass member 36 coupled to the second mass member 35. The first mass member 34 is located at the plus side in the X direction with respect to the rotation axis J1 and the second mass member 35 and the third mass member 36 are located at the minus side in the X direction with respect to the rotation axis J1. The second mass member 35 and the third mass member 36 are longer than the first mass member 34 in the X direction, and rotation moment around the rotation axis J1 when the acceleration Az in the Z axis is applied is larger than that of the first mass member 34.

When the acceleration Az is applied, the first movable member 31 seesaw-swings around the rotation axis J1 due to the difference in rotation moment. Note that the seesaw-swing refers to displacement of the second mass member 35 toward the minus side in the Z direction when the first mass member 34 is displaced toward the plus side in the Z direction and, oppositely, displacement of the second mass member 35 toward the plus side in the Z direction when the first mass member 34 is displaced toward the minus side in the Z direction.

The first movable member 31 has first coupling members 39 coupling the first mass member 34 and the second mass member 35 and an opening 45 located between the first mass member 34 and the second mass member 35. The holding member 32 and the first supporting beams 33 are placed within the opening 45. As described above, the holding member 32 and the first supporting beams 33 are placed inside of the first movable member 31, and thereby, the sensor element 3 may be downsized.

Furthermore, the first movable member 31 has a plurality of through holes formed uniformly in the entire thereof. Thereby, damping by viscosity may be optimized. That is, when an acceleration is applied in a normal operation, the seesaw-swing may be easily converged by the damping effect. A too high or too low damping effect adversely affects the detection operation. A general inertial sensor sensing an acceleration is appropriately designed by setting the pressure of the atmosphere to 0.1 times to 1.0 time of the atmospheric pressure and the shape and the number of the through holes. When a necessary and sufficient damping effect is obtained, the through holes may be omitted or the uniform arrangement is not necessarily required.

In the first movable member 31, the first coupling members 39 and the holding member 32 arranged in the Y direction are coupled by the first supporting beams 33 extending in the Y direction. Accordingly, when the acceleration Az in the Z-axis is applied to the first movable member 31, the first movable member 31 may be displaced by seesaw-swing around the rotation axis J1 with the first supporting beams 33 as the rotation axis J1.

Note that the acceleration applied to the inertial sensor 1 is not limited to the acceleration Az in the Z-axis. For example, an acceleration Ay in the Y-axis may be applied due to an impact by dropping of the inertial sensor 1 or the like. When the acceleration Ay is applied, the first movable member 31 is displaced within the XY-plane.

This is because the lengths of the second mass member 35 and the third mass member 36 in the X direction are longer than that of the first mass member 34, and the rotation moment around the Z-axis when the acceleration Ay is applied is larger than that of the first mass member 34 and the first supporting beams 33 bend due to the difference in rotation moment.

Here, when a center line L along the X direction of the first movable member 31 is defined as a center line bisecting the first movable member 31 in an axial line direction of the rotation axis J1 of the first movable member 31, the first movable member 31 is supported by the substrate 2 so that the mass at the plus side in the Y direction with respect to the center line L along the X direction of the first movable member 31 and the mass at the minus side in the Y direction with respect to the center line L along the X direction of the first movable member 31 may be substantially equal by the fixing members 22. Accordingly, when the acceleration Ay is applied, one of the first supporting beam 33 placed at the plus side in the Y direction with respect to the center line L and the first supporting beam 33 placed at the minus side in the Y direction with respect to the center line L bends toward the plus side in the X direction and the other bends toward the minus side in the X direction. That is, when the acceleration Ay is applied, the first movable member 31 is displaced within the XY-plane around an intersection point P of the center line L and the rotation axis J1 as a rotation center around the Z-axis.

Note that, in the embodiment, the holding member 32 and the first supporting beams 33 are placed within the opening 45 located between the first mass member 34 and the second mass member 35, and the first supporting beams 33 couple the first movable member 31 and the fixing members 22 via the holding member 32, and thereby, the intersection point P substantially coincides with the center of the fixing members 22.

The first mass member 34 includes the two mass parts and coupled by a second coupling member 400 and fourth coupling members 401. The second coupling member 400 couples the two mass parts forming the first mass member 34 in the center part in the Y-axis, that is, on the center line L. The fourth coupling members 401 couple the two mass parts forming the first mass member 34 in the end parts in the Y-axis.

The second movable member 381 is placed at the plus side in the Y-axis of the second coupling member 400 of the first mass member 34. The second movable member 381 extends toward the center part in the Y-axis, i.e., the center line L from the fourth coupling member 401 side. Both sides in the X-axis of the second movable member 381 and the two mass parts are respectively coupled by the second supporting beam 371 extending in the X direction. In other words, the free end of the second movable member 381 is located at the center line L side and the sides coupled to the second supporting beam 371 of the second movable member 381 are located at the opposite side to the center L side, and the sides coupled to the second supporting beam 371 of the second movable member 381 are located at the opposite side to the center line L side, i.e. at the outer edge side of the first movable member 31.

The third movable member 382 is placed at the minus side in the Y direction of the second coupling member 400 of the first mass member 34. The third movable member 382 extends toward the center part in the Y-axis, i.e., the center line L from the fourth coupling member 401 side. Both sides in the X-axis of the third movable member 382 and the two mass parts are respectively coupled by the third supporting beam 372 extending in the X direction. In other words, the free end of the third movable member 382 is located at the center line L side, and the sides coupled to the third supporting beam 372 of the third movable member 382 are located at the opposite side to the center line L side, i.e. at the outer edge side of the first movable member 31. Further, the second coupling member 400 is placed between the free end of the second movable member 381 and the free end of the third movable member 382.

The second supporting beam 371 provided at the plus side in the Y-axis of the second coupling member 400 couples the second movable members 381 extending toward the plus side in the Y-axis and the two mass parts of the first mass member 34 arranged in the X-axis. The second supporting beam 371 is provided at both sides in the X-axis closer to the end part at the fourth coupling member 401 side of the second movable member 381 than the end part as the free end at the second coupling member 400 side of the second movable member 381. Therefore, a center of gravity G1 of the second movable member 381 placed at the plus side in the Y-axis of the second coupling member 400 is located closer to the center line L along the X-axis of the first movable member 31 than the second supporting beam 371.

Further, the third supporting beam 372 placed at the minus side in the Y-axis of the second coupling member 400 couples the third movable member 382 extending toward the minus side in the Y-axis and the two mass parts of the first mass member 34 arranged in the X-axis and is provided at both sides in the X-axis closer to the end part at the fourth coupling member 401 side of the third movable member 382 than the end part as the free end at the second coupling member 400 side of the third movable member 382. Therefore, a center of gravity G2 of the third movable member 382 placed at the minus side in the Y-axis of the second coupling member 400 is located closer to the center line L along the X-axis of the first movable member 31 than the third supporting beam 372.

The second supporting beam 371 and the second movable member 381 located at the plus side in the Y-axis of the second coupling member 400 and the third supporting beam 372 and the third movable member 382 located at the minus side in the Y-axis of the second coupling member 400 are line-symmetrically placed with respect to the center line L along the X direction of the first movable member 31 as an axis of symmetry. As described above, the second supporting beam 371 and second movable member 381 and the third supporting beam 372 and third movable member 382 are placed equally symmetrically, and thereby, an adverse effect by parasitic capacitance may be eliminated and input amounts of charge to the QV amplifier to be described later may be made equal in the natural state without application of the acceleration Az. Therefore, highly accurate detection with a less offset amount may be performed.

As described above, when the acceleration Ay in the Y-axis is applied, the first movable member 31 is displaced within the XY-plane around the intersection point P as the rotation center about the Z-axis. Concurrently, rotation moment around the intersection point P as the rotation center about the Z-axis is also generated at the center of gravity G1 of the second movable member 381. Accordingly, the second movable member 381 is displaced within the XY-plane while bending the second supporting beam 371. In this regard, the closer to the center line L the center of gravity G1 of the second movable member 381 extending in the Y direction, the lower the rotation moment generated at the center of gravity G1. That is, the center of gravity G1 of the second movable member 381 is closer to the center line L and the displacement of the second movable member 381 within the XY-plane is smaller. As described above, the displacement of the second movable member 381 within the XY-plane may be suppressed with the lower rotation moment generated at the center of gravity G1, and thereby, stress concentration on the second supporting beam 371 due to the displacement of the second movable member 381 within the XY-plane may be reduced and unnecessary vibration generated due to vibration of the second movable member 381 may be reduced.

Further, when the acceleration Ay in the Y-axis is applied, the first movable member 31 is displaced within the XY-plane, and thereby, like the second movable member 381, the third movable member 382 is displaced within the XY-plane while bending the third supporting beam 372. In this regard, the closer to the center line L the center of gravity G2 of the third movable member 382 extending in the Y direction, the lower the rotation moment generated at the center of gravity G2. Accordingly, the displacement of the third movable member 382 within the XY-plane may be suppressed, and thereby, stress concentration on the third supporting beam 372 due to the displacement of the third movable member 382 within the XY-plane may be reduced and unnecessary vibration generated due to vibration of the third movable member 382 may be reduced.

As described above, the displacement of the second movable member 381 and the third movable member 382 within the XY-plane may be suppressed and the stress concentration on the second supporting beam 371 and the third supporting beam 372 may be reduced, and thereby, the inertial sensor 1 with higher impact resistance is obtained. Further, the unnecessary vibration generated due to the vibration of the second movable member 381 and the third movable member 382 is reduced, and thereby, the inertial sensor 1 that may accurately detect the acceleration Az is obtained.

In addition, the second movable member 381 placed at the plus side in the Y direction of the second coupling member 400 and the third movable member 382 placed at the minus side in the Y direction of the second coupling member 400 are line-symmetrically placed with respect to the center line L along the X direction of the first movable member 31, and thereby, the second movable member 381 and the third movable member 382 are symmetrically displaced with respect to the center line L, and the inertial sensor 1 that may accurately detect the acceleration Az with the suppressed unnecessary displacement of the first movable member 31 is obtained.

The second mass member 35 includes two mass parts and is coupled by the second coupling member 400 and the fourth coupling member 401 like the first mass member 34. Further, the second movable member 381 and the second supporting beam 371 are placed at the plus side in the Y direction of the second coupling member 400 of the second mass member 35, and the third movable member 382 and the third supporting beam 372 are placed at the minus side in the Y direction of the second coupling member 400 of the second mass member 35. Like the first mass member 34, the second supporting beam 371 and second movable member 381 and the third movable member 382 and third supporting beam 372 are line-symmetrically placed with respect to the center line L along the X direction of the first movable member 31 as an axis of symmetry.

As described above, in the second mass member 35, like the first mass member 34, the center of gravity G1 of the second movable member 381 placed at the plus side in the Y direction of the second coupling member 400 is located in a position closer to the center line L along the X direction of the first movable member 31 than the second supporting beam 371 and the center of gravity G2 of the third movable member 382 placed at the minus side in the Y direction of the second coupling member 400 is located in a position closer to the center line L along the X direction of the first movable member 31 than the third supporting beam 372. Accordingly, the stress concentration on the second supporting beam 371 and the third supporting beam 372 due to the displacement of the second movable member 381 and the third movable member 382 within the XY-plane may be reduced, and the unnecessary vibration generated due to the vibration of the second movable member 381 and the third movable member 382 may be reduced. Further, the second movable member 381 and the third movable member 382 are line-symmetrically placed with respect to the center line L along the X direction of the first movable member 31, and thereby, the inertial sensor 1 that may accurately detect the acceleration Az with the suppressed unnecessary displacement of the first movable member 31 is obtained. Also, in the second mass member 35, the second supporting beam 371 and second movable member 381 and the third supporting beam 372 and third movable member 382 are placed equally symmetrically, and thereby, an adverse effect of parasitic capacitance may be eliminated and input amounts of charge to the QV amplifier to be described later may be made equal in the natural state without application of the acceleration Az. Therefore, highly accurate detection with a less offset amount may be performed.

The rotation axis J2 of the second supporting beam 371 and the rotation axis J3 of the third supporting beam 372 extend along the X direction and the rotation axis J2 of the second supporting beam 371 and the rotation axis J3 of the third supporting beam 372 extend along a direction orthogonal to the Y direction, and thereby, the impact resistance from the X-axis may be improved. That is, the second movable member 381 supported by the second supporting beam 371 and the third movable member 382 supported by the third supporting beam 372 are displaced within the XY-plane around the respective end parts at the sides closer to the second supporting beam 371 and the third supporting beam 372, and thereby, impact energy from the X-axis may be dissipated. The impact energy from the X-axis is dissipated, and thereby, the first movable member 31 is harder to be displaced largely in the X-axis, and the inertial sensor 1 having higher impact resistance and characteristics harder to be deteriorated is obtained.

Further, in the embodiment, the two second supporting beams 371 and the two second movable members 381 are symmetrically placed with respect to the Y direction parallel to the rotation axis J1. Similarly, the two third supporting beams 372 and the two third movable members 382 are symmetrically placed with respect to the Y direction parallel to the rotation axis J1. Accordingly, the inertial sensor 1 may detect the acceleration Az more accurately with suppressed unnecessary displacement around the rotation axis J1 of the first movable member 31 is obtained.

The end part at the plus side in the X direction of the second mass member 35 is coupled to the first mass member 34 by the first coupling members 39, and the end part at the minus side in the X direction is coupled to the third mass member 36 by third coupling members 41. An opening 46 for equalizing the areas on the XY plane between the first mass member 34 and the second mass member 35 is provided between the second mass member 35 and the third mass member 36.

The second supporting beams 371 placed in the first mass member 34 and the second mass member 35 have beam shapes extending in the X direction, and thereby, act as the rotation axis J2 along the X-axis crossing the rotation axis J1 and may swing the second movable members 381 coupled to the second supporting beams 371 around the rotation axis J2.

The third supporting beams 372 placed in the first mass member 34 and the second mass member 35 have beam shapes extending in the X direction, and thereby, act as the rotation axis J3 along the X-axis crossing the rotation axis J1 and may swing the third movable members 382 coupled to the third supporting beams 372 around the rotation axis J3.

The substrate 2 includes the projections 23 projecting toward the second movable members 381 and the third movable members 382. In the plan view from the Z direction, the projections 23 are placed in the positions overlapping with the end parts as the free ends at the opposite sides to the sides of the second movable members 381 coupled to the second supporting beams 371 and the positions overlapping with the end parts as the free ends at the opposite sides to the sides of the third movable members 382 coupled to the third supporting beams 372.

Next, the first detection electrode 24 and the second detection electrode 25 placed on the bottom surface of the first concave portion 21 and the dummy electrode 26 placed on the bottom surface of the second concave portion 21a will be explained.

As shown in FIGS. 1 and 2, in the plan view from the Z direction, the first detection electrode 24 is placed to overlap with the first mass member 34 and the second detection electrode 25 is placed to overlap with the second mass member 35. These first detection electrode 24 and second detection electrode 25 are provided substantially symmetrically with respect to the rotation axis J1 in the plan view from the Z direction so that capacitances Ca, Cb, which will be described later, may be equal in the natural state without the application of the acceleration Az. Note that the insulating layers 231 are provided in the parts in which the first detection electrode 24 and the second detection electrode 25 overlap with the projections 23. The insulating layers 231 prevent short circuit between the first movable member 31 and the first detection electrode 24 and second detection electrode 25.

Further, the dummy electrode 26 is located at the minus side in the X direction of the second detection electrode 25 and provided to overlap with the third mass member 36. As described above, the bottom surface of the second concave portion 21a is covered by the dummy electrode 26, and thereby, charging of the bottom surface of the second concave portion 21a with movement of alkali metal ions in the substrate 2 may be suppressed. Accordingly, generation of an unintended electrostatic attractive force causing an erroneous operation of the first movable member 31 between the bottom surface of the second concave portion 21a and the third mass member 36 may be effectively suppressed. Therefore, the inertial sensor 1 that may detect the acceleration Az with higher accuracy is obtained.

The first detection electrode 24 and the second detection electrode 25 are electrically coupled to a differential QV amplifier (not shown). When the inertial sensor 1 is driven, a drive signal is applied to the sensor element 3, and thereby, the capacitance Ca is formed between the first mass member 34 and the first detection electrode 24. Similarly, the capacitance Cb is formed between the second mass member 35 and the second detection electrode 25. The capacitances Ca, Cb are substantially equal to each other in the natural state without the application of the acceleration Az.

When the acceleration Az is applied to the inertial sensor 1, the first movable member 31 seesaw-swings around the rotation axis J1. By the seesaw-swing of the first movable member 31, a gap between the first mass member 34 and the first detection electrode 24 and a gap between the second mass member 35 and the second detection electrode 25 change in opposite phase and consequently the capacitances Ca, Cb change in opposite phase to each other. Accordingly, the inertial sensor 1 may detect the acceleration Az based on the difference in capacitance value between the capacitances Ca, Cb.

Figure 3:
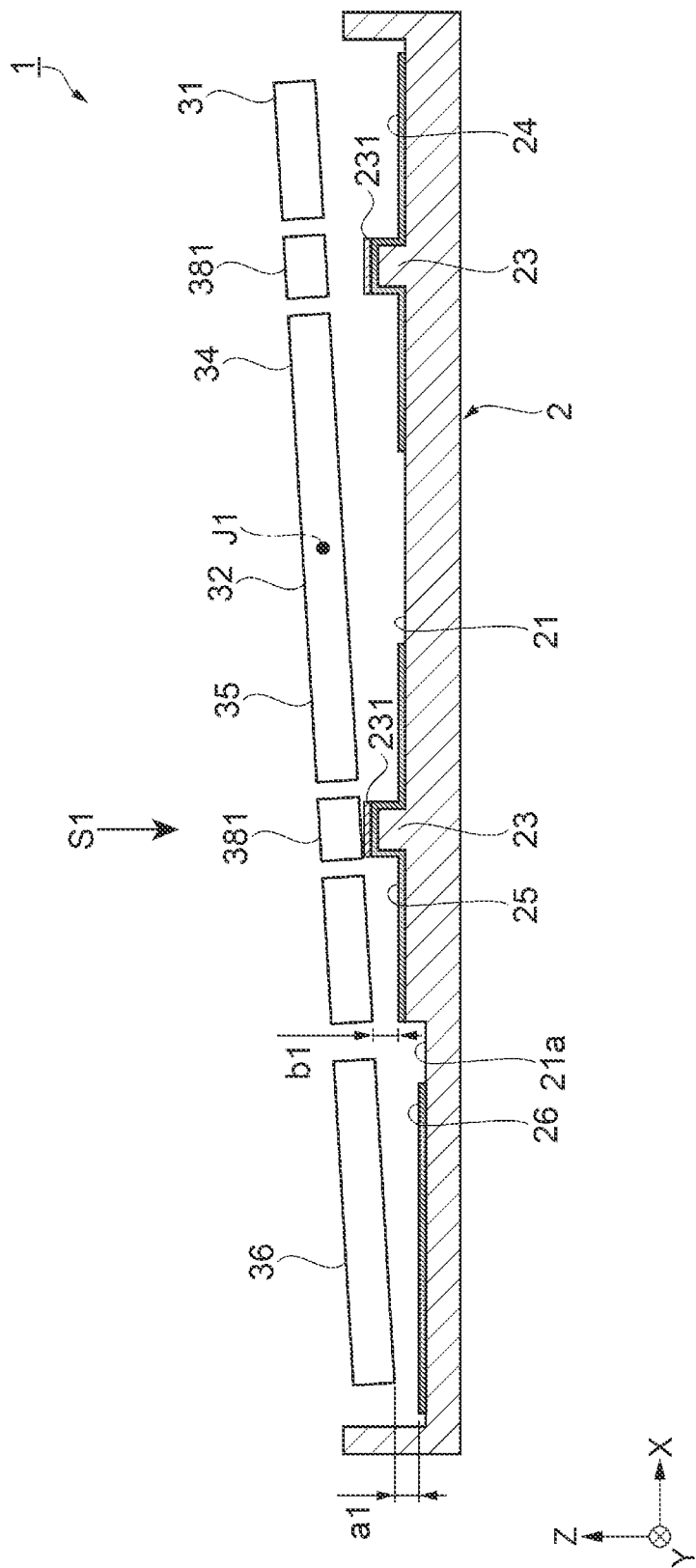
FIG. 3 is a schematic diagram for explanation of motion of the inertial sensor according to embodiment 1.
Figure 4:
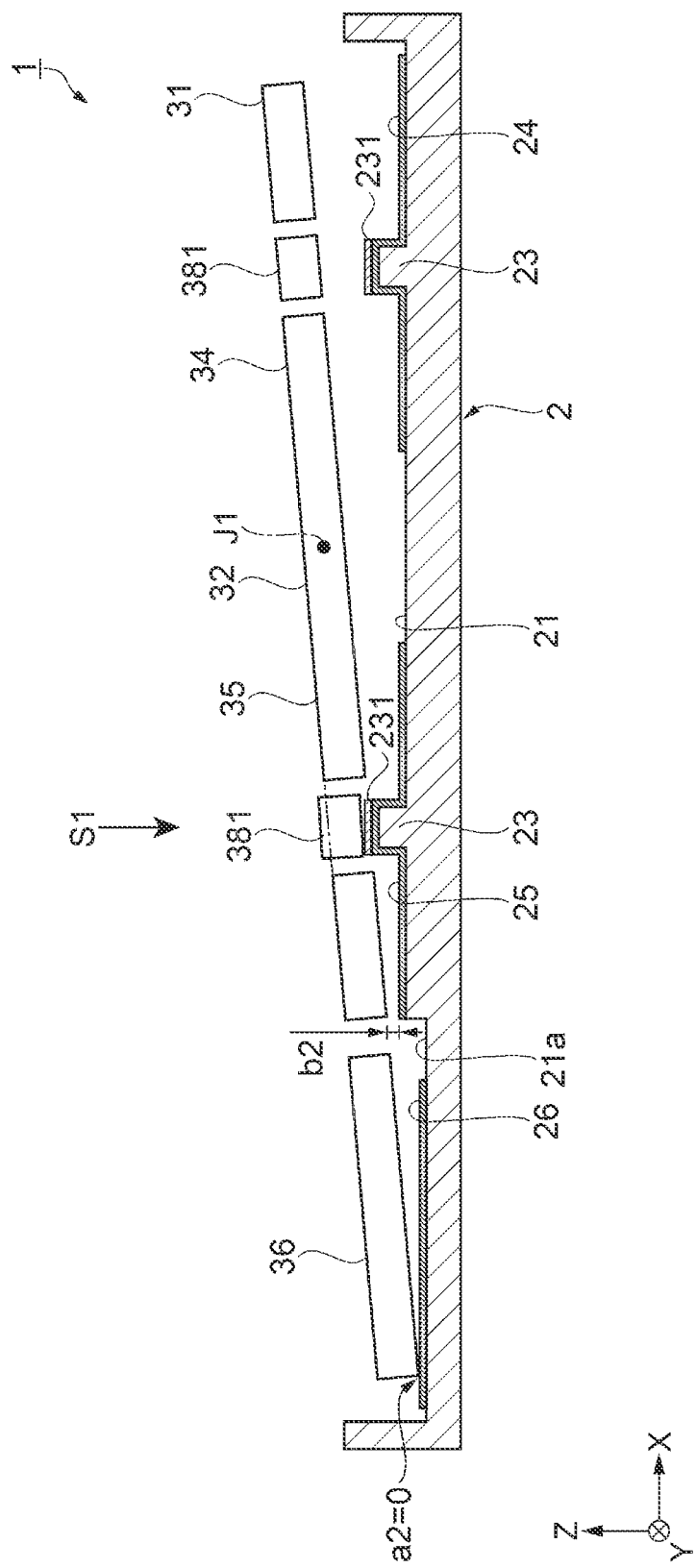
FIG. 4 is a schematic diagram for explanation of motion of the inertial sensor according to embodiment 1.

FIGS. 3 and 4 schematically show the motion of the inertial sensor 1 when accelerations S1, S2 exceeding the measurable maximum value, e.g. about 50 G are respectively applied as the accelerations Az in the Z direction to the inertial sensor 1. Note that the direction of the accelerations S1, S2 are toward the minus side in the Z-axis and, regarding the magnitude of the absolute values of the accelerations S1, S2, measurable maximum value<S1<S2 is satisfied. For convenience of explanation, the lid 5, the fixing members 22, etc. are omitted.

As shown in FIG. 3, when the acceleration S1 is applied as the acceleration Az in the Z-axis to the inertial sensor 1, the first movable member 31 seesaw-swings around the rotation axis J1 and the second movable members 381 contact the projections 23. When the shortest distance between the third mass member 36 and the dummy electrode 26 is a1 and the shortest distance between the second mass member 35 and the second detection electrode 25 is b1, a1<b1 is satisfied. The relationship between a1 and b1 is a design item, however, in a case of the capacitive detection method, short circuit between the movable electrode and the detection electrode causes a failure of the QV amplifier at the downstream and b1>a1≠0 is desirable.

The torsional rigidity around the rotation axis J2 of the second supporting beams 371 is higher than the torsional rigidity around the rotation axis J1 of the first supporting beam 33. Accordingly, the amount of displacement of the second movable members 381 by the second supporting beams 371 is smaller than the amount of displacement of the first movable member 31 by the first supporting beams 33, and the second supporting beams 371 and the second movable members 381 may function as stoppers. Until the second movable members 381 contact the projections 23, torsion is not generated in the second supporting beams 371 and energy of displacement is not accumulated.

Further, the resonance frequency around the rotation axis J2 of the second movable members 381 is twice or more of the resonance frequency around the rotation axis J1 of the first movable member 31. The resonance frequency around the rotation axis J2 of the second movable members 381 is set to twice or more of the resonance frequency around the rotation axis J1 of the first movable member 31, and thereby, when the acceleration Az in the Z-axis is detected, the acceleration Az may be detected in a substantially stationary state of the second movable members 381 relative to the first movable member 31, i.e., in a state in which the first movable member 31 and the second movable members 381 are regarded as a single rigid body seesaw-swinging around the rotation axis J1.

The acceleration Az may be detected in the state in which the first movable member 31 and the second movable members 381 are regarded as the single rigid body seesaw-swinging around the rotation axis J1, and thereby, high-accuracy detection can be performed with a less influence by the vibration of the second movable members 381. Further, the second movable members 381 may be used as electrodes for formation of the capacitance Ca between the first detection electrode 24 and themselves and the capacitance Cb between the second detection electrode 25 and themselves together with the first mass member 34 and the second mass member 35. Accordingly, the capacitances Ca, Cb may be made larger and the detection with higher accuracy can be performed.

Note that, in embodiment 1, for example, the resonance frequency around the rotation axis J2 of the second movable members 381 is 1 to 2 kHz and the resonance frequency around the rotation axis J1 of the first movable member 31 is 5 kHz. To set the resonance frequency around the rotation axis J2 of the second movable members 381 to twice or more of the resonance frequency around the rotation axis J1 of the first movable member 31, for example, the torsional rigidity around the rotation axis J2 of the second supporting beams 371 may be set to be higher than the torsional rigidity around the rotation axis J1 of the first supporting beams 33.

As shown in FIG. 4, when the acceleration S2 higher than the acceleration S1 is applied as the acceleration Az in the Z-axis to the inertial sensor 1, the second movable members 381 contact the projections 23, and further, the first movable member 31 collides with the second concave portion 21a while the second movable members 381 are pushed upward by the projections 23 toward the plus side in the Z direction. In this regard, when the shortest distance between the third mass member 36 and the dummy electrode 26 is a2 and the shortest distance between the second mass member 35 and the second detection electrode 25 is b2, b2>a2=0 is satisfied. The second movable members 381 are pushed upward toward the plus side in the Z direction, and thereby, the second supporting beams 371 torsionally deform around the rotation axis J2. That is, deformation energy is accumulated in the second supporting beams 371. As described above, when the second supporting beams 371 torsionally deform around the rotation axis J2, part of impact energy applied to the inertial sensor 1 by the acceleration S2 is accumulated and absorbed in the second supporting beams 371, and thus, the impact energy of the collision between the first movable member 31 and the second concave portion 21a is relaxed and stiction is harder to be caused.

When excessive seesaw-swing is generated in the first movable member 31, the second movable members 381 contact the projections 23 and the second supporting beams 371 torsionally deform around the rotation axis J2, and thereby, part of impact energy applied to the inertial sensor 1 is accumulated and absorbed in the second supporting beams 371. Accordingly, the impact with the projections 23 may be reduced and more seesaw-swing of the first movable member 31 may be restricted while breakage of the second movable members 381 and the projections 23 is reduced.

Therefore, the second supporting beams 371 and the second movable members 381 may function as dampers that absorb the impact.

The third supporting beams 372 and the third movable members 382 have the same function as the second supporting beams 371 and the second movable members 381.

The torsional rigidity around the rotation axis J3 of the third supporting beams 372 is higher than the torsional rigidity around the rotation axis J1 of the first supporting beams 33, and the third supporting beams 372 and the third movable members 382 may function as stoppers.

Further, the resonance frequency around the rotation axis J3 of the third movable members 382 is twice or more of the resonance frequency around the rotation axis J1 of the first movable member 31, and the acceleration Az may be detected in a state in which the first movable member 31 and the third movable members 382 are regarded as a single rigid body seesaw-swinging around the rotation axis J1. Therefore, the high-accuracy detection can be performed with a less influence by the vibration of the third movable members 382. Furthermore, the third movable members 382 may be used as electrodes, and capacitances Ca, Cb may be made larger and the detection with higher accuracy can be performed.

When the acceleration S2 higher than the acceleration S1 is applied, the third movable members 382 contact the projections 23 and the third movable members 382 are pushed upward by the projections 23 toward the plus side in the Z direction, the third supporting beams 372 torsionally deform around the rotation axis J3, and part of the impact energy is accumulated and absorbed in the third supporting beams 372. Therefore, the impact energy of the collision between the first movable member 31 and the second concave portion 21a is relaxed and the stiction is harder to be caused. Further, the third supporting beams 372 and the third movable members 382 may function as dampers that absorb the impact.

The second supporting beam 371 and the third supporting beam 372 are line-symmetrically placed with respect to the center line L along the X direction of the first movable member 31 as the line of symmetry and the second supporting beam 371 and the third supporting beam 372 extend in the X direction. That is, the second supporting beam 371 and the third supporting beam 372 are placed substantially in parallel, and the respective lengths in the X direction of the second supporting beam 371 and the third supporting beam 372 may be made longer and the impact with the projections 23 may be further reduced.

2. Embodiment 2

Figure 5:
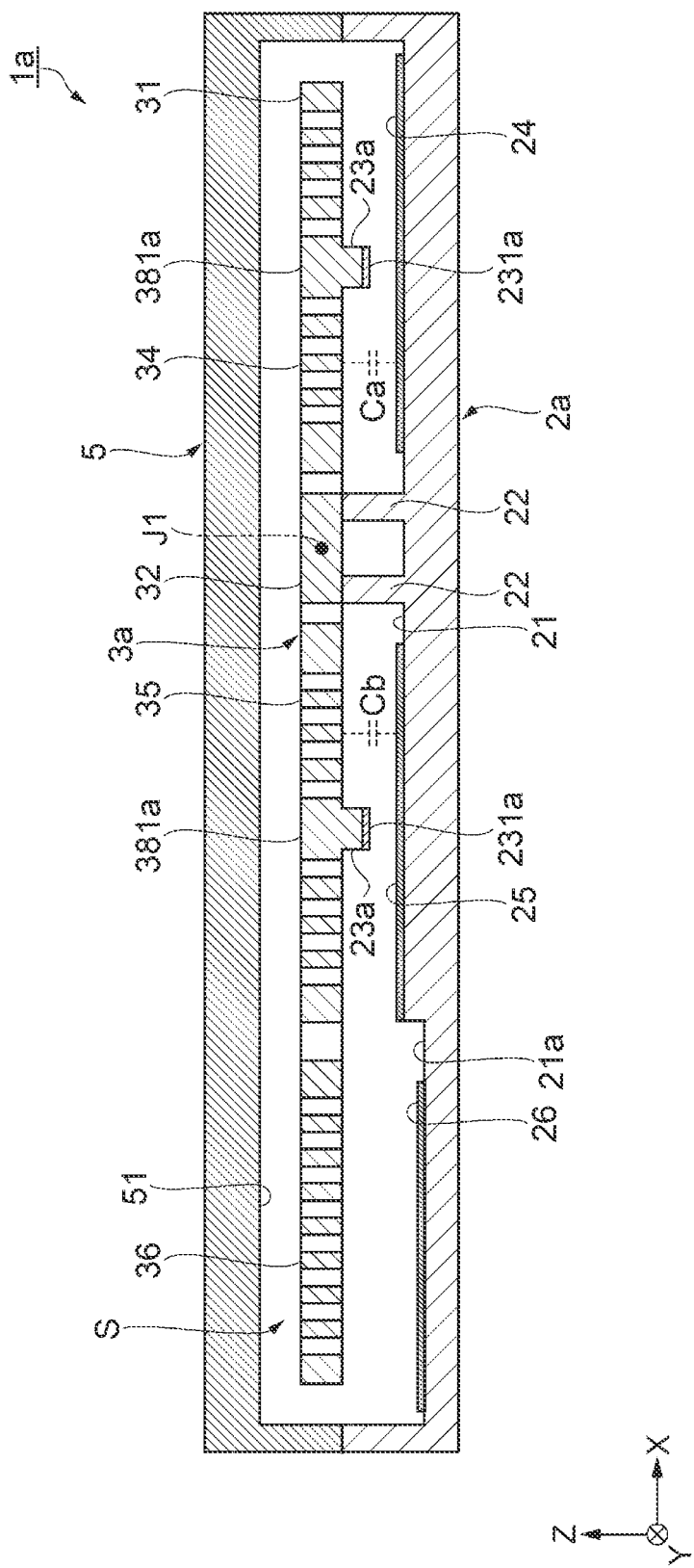
FIG. 5 is a sectional view showing a schematic structure of an inertial sensor according to embodiment 2.

Next, an inertial sensor 1a according to embodiment will be explained with reference to FIG. 5. FIG. 5 corresponds to a sectional view along line A-A in FIG. 1.

The inertial sensor 1a of the embodiment is the same as the inertial sensor 1 of embodiment 1 except that structures of a sensor element 3a and a substrate 2a are different from the inertial sensor 1 of embodiment 1. The embodiment will be explained with a focus on the differences from the above described embodiment 1 and the explanation of the same items will be omitted.

As shown in FIG. 5, in the sensor element 3a of the inertial sensor 1a, projections 23a projecting toward the substrate 2a are provided in second movable members 381a. Accordingly, when excessive seesaw-swing is generated in the first movable member 31, the projections 23a provided in the second movable members 381a contact the bottom surface of the first concave portion 21 of the substrate 2a, and thereby, the same effects as those of the inertial sensor 1 of embodiment 1 may be obtained. Note that the projections 23a include insulating layers 231a for preventing short circuit.

3. Embodiment 3

Figure 6:
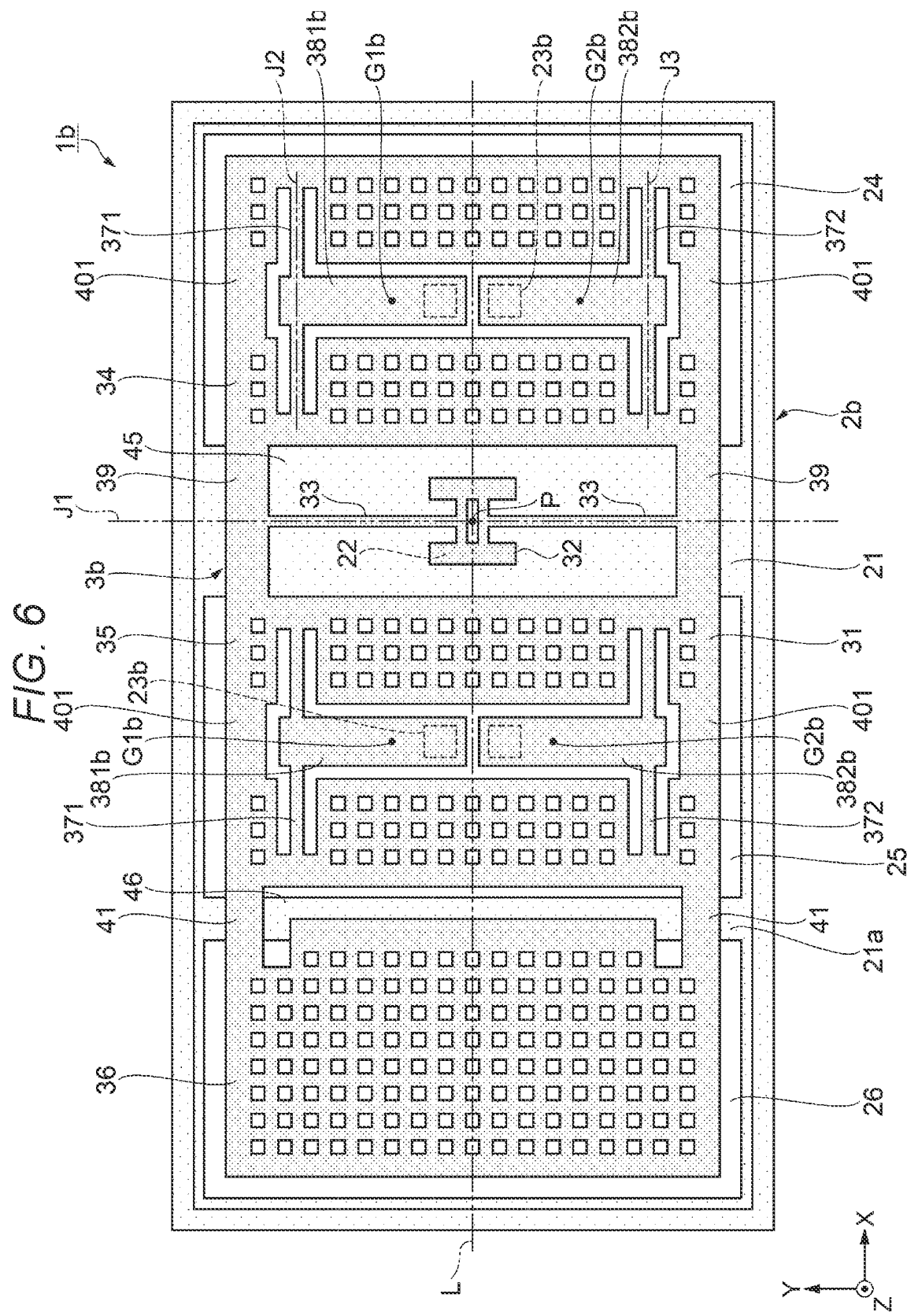
FIG. 6 is a plan view showing a schematic structure of an inertial sensor according to embodiment 3.

Next, an inertial sensor 1b according to embodiment 3 will be explained with reference to FIG. 6. FIG. 6 shows a state in which the lid 5 is detached for convenience of explanation.

The inertial sensor 1b of the embodiment is the same as the inertial sensor 1 of embodiment 1 except that structures of a sensor element 3b and a substrate 2b are different from the inertial sensor 1 of embodiment 1. The embodiment will be explained with a focus on the differences from the above described embodiment 1 and the explanation of the same items will be omitted.

In the inertial sensor 1b of the embodiment, the second coupling members 400 are omitted compared to embodiment 1, a free end of a second movable member 381b is located at an opposite side to a side of the second movable member 381b coupled to the second supporting beam 371, and a free end of a third movable member 382b is located at an opposite side to a side of the third movable member 382b coupled to the third supporting beam 372. The free end of the second movable member 381b and the free end of the third movable member 382b are placed to face each other with the center line L in between. That is, the free end of the second movable member 381b is closer to the center line L than that of embodiment 1 and a length of the second movable member 381b in the Y direction is longer than that of embodiment 1. Further, the free end of the third movable member 382b is closer to the center line L than that of embodiment 1 and a length of the third movable member 382b in the Y direction is longer than that of embodiment 1. The first mass member 34 of the sensor element 3b includes two mass parts, and the two mass parts are coupled by the fourth coupling members 401 at ends of the two mass parts in the Y-axis. The second mass member 35 similarly includes two mass parts, and the two mass parts are coupled by the fourth coupling members 401 at ends of the two mass parts in the Y-axis.

The second movable member 381b extends toward the center part in the Y direction, i.e., the center line L from the fourth coupling member 401 side, and both sides in the X-axis of the second movable member 381b and the two mass parts are respectively coupled by the second supporting beam 371 extending in the X direction.

The second supporting beam 371 is provided at both sides in the X-axis closer to the end part at the fourth coupling member 401 side of the second movable member 381b than the end part as the free end at the side of the second movable member 381b closer to the center line L. Therefore, a center of gravity G1b of the second movable member 381b is located closer to the center line L than the second supporting beam 371.

A projection 23b is placed in a position overlapping with the end part as the free end at the opposite side to the side of the second movable member 381b coupled to the second supporting beam 371 in the plan view from the Z direction.

In the embodiment, the second coupling member 400 is not provided, and the end part as the free end at the side of the second movable member 381b closer to the center line L may be made even closer to the center line L than that of embodiment 1. Therefore, the center of gravity G1b of the second movable member 381*b* may be located in the position even closer to the center line L.

According to the embodiment, the following effects may be obtained in addition to the effects in embodiment 1. When the acceleration Ay in the Y-axis is applied, rotation moment about the Z-axis around the intersection point P as the rotation center is generated at the center of gravity G1*b* of the second movable member 381*b*, however, the center of gravity G1*b* of the second movable member 381*b* extending in the Y direction may be made even closer to the center line L and the rotation moment generated at the center of gravity G1*b* may be made lower, and therefore, the displacement of the second movable member 381*b* within the XY-plane may be further suppressed. Accordingly, stress concentration on the second supporting beam 371 is reduced and the inertial sensor 1*b* with higher impact resistance is obtained. Further, unnecessary vibration generated due to vibration of the second movable member 381*b* is reduced and the inertial sensor 1*b* that may accurately detect the acceleration Az is obtained.

The second movable member 381*b* is explained and, as is the case with the third movable member 382*b*, the end part as the free end at the side of the third movable member 382*b* closer to the center line L may be made even closer to the center line L than that of embodiment 1. Therefore, a center of gravity G2*b* of the third movable member 382*b* may be located in the position even closer to the center line L, and, when the acceleration Ay in the Y-axis is applied, rotation moment about the Z-axis around the intersection point P as the rotation center generated at the center of gravity G2*b* of the third movable member 382*b* may be made even lower.

4. Embodiment 4

Figure 7:
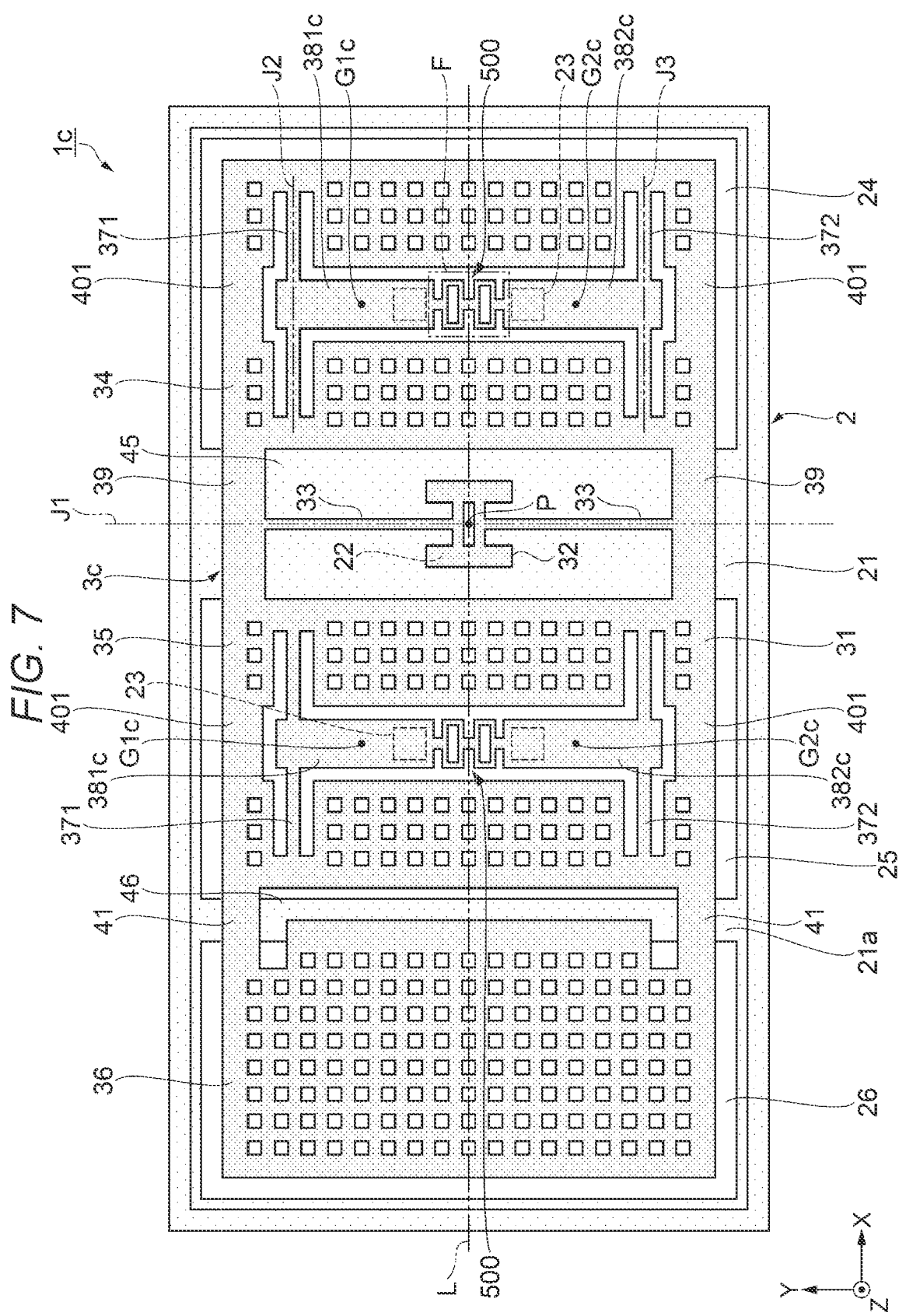
FIG. 7 is a plan view showing a schematic structure of an inertial sensor according to embodiment 4.
Figure 8:
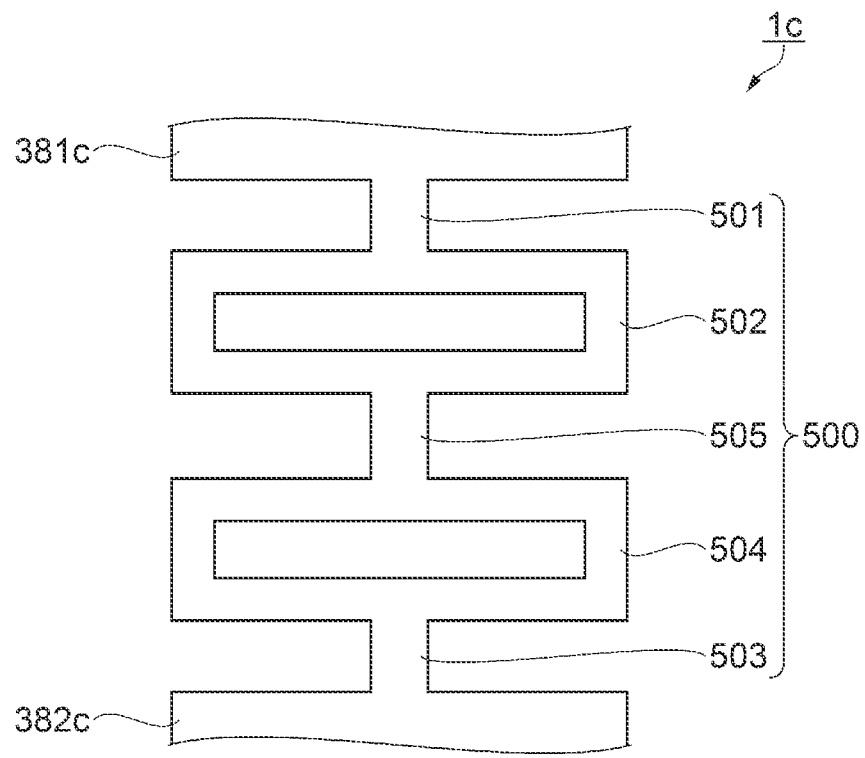
FIG. 8 is a plan view corresponding to a position of an F portion in FIG. 7.

Next, an inertial sensor 1*c* according to embodiment 4 will be explained with reference to FIGS. 7 and 8. FIG. 7 shows a state in which the lid 5 is detached for convenience of explanation. FIG. 8 corresponds to a plan view in a position of an F portion in FIG. 7.

The inertial sensor 1*c* of the embodiment is the same as the inertial sensor 1 of embodiment 1 except that a structure of a sensor element 3*c* is different from the inertial sensor 1 of embodiment 1. The embodiment will be explained with a focus on the differences from the above described embodiment 1 and the explanation of the same items will be omitted.

Like embodiment 1 to embodiment 3, a free end of a second movable member 381*c* is located at an opposite side to a side of the second movable member 381*c* coupled to the second supporting beam 371, and a free end of a third movable member 382*c* is located at an opposite side to a side of the third movable member 382*c* coupled to the third supporting beam 372. In the inertial sensor 1*c* of the embodiment, like embodiment 3, the second coupling members 400 are omitted. Further, in the embodiment, the free end of the second movable member 381*c* and the free end of the third movable member 382*c* are coupled by an elastic beam 500. The first mass member 34 of the inertial sensor 1*c* includes two mass parts, and the two mass parts are coupled by the fourth coupling members 401 at ends of the two mass parts in the Y-axis. The second mass member 35 similarly includes two mass parts, and the two mass parts are coupled by the fourth coupling members 401 at ends of the two mass parts in the Y-axis.

The second movable member 381*c* extends toward the center part in the Y-axis, i.e., the center line L from the fourth coupling member 401 side, and both sides in the X-axis of the second movable member 381*c* and the two mass parts are respectively coupled by the second supporting beam 371 extending in the X direction.

The second supporting beam 371 is provided at both sides in the X-axis closer to the end part at the fourth coupling member 401 side of the second movable member 381*c* than the end part as the free end at the side of the second movable member 381*c* closer to the center line L. Therefore, a center of gravity G1*c* of the second movable member 381*c* is located in a position closer to the center line L than the second supporting beam 371.

The second movable member 381*c* is explained and, as is the case with a third movable member 382*c*, the third movable member 382*c* extends toward the center line L, both sides in the X-axis of the third movable member 382*c* and the two mass parts are respectively coupled by the third supporting beam 372 extending in the X direction, and the third supporting beam 372 is provided at both sides in the X-axis closer to the end part at the fourth coupling member 401 side of the third movable member 382*c* than the end part as the free end at the side of the third movable member 382*c* closer to the center line L. Therefore, a center of gravity G2*c* of the third movable member 382*c* is located closer to the center line L than the third supporting beam 372.

In the embodiment, the second movable member 381*c* and the third movable member 382*c* line-symmetrically placed with respect to the center line L as an axis of symmetry and facing each other have the end part as the free end at the side of the second movable member 381*c* closer to the center line L and the end part as the free end at the side of the third movable member 382*c* closer to the center line L coupled by the elastic beam 500.

The elastic beam 500 has a first beam 501 extending from the end part as the free end at the side of the second movable member 381*c* closer to the center line L toward the facing third movable member 382*c*, a second beam 502 coupled to the first beam 501 in a rectangular frame shape having an opening at the center, a third beam 503 extending from the end part as the free end at the side of the third movable member 382*c* closer to the center line L toward the facing second movable member 381*c*, a fourth beam 504 coupled to the third beam 503 in a rectangular frame shape having an opening at the center, and a fifth beam 505 coupling the second beam 502 and the fourth beam 504.

According to the embodiment, the following effects may be obtained in addition to the effects in embodiment 1.

When the acceleration Ay in the Y-axis is applied, rotation moment about the Z-axis around the intersection point P as the rotation center is respectively generated at the center of gravity G1*c* of the second movable member 381*c* and the center of gravity G2*c* of the third movable member 382*c*. The end part as the free end at the side of the second movable member 381*c* closer to the center line L and the end part as the free end at the side of the third movable member 382*c* closer to the center line L are coupled by the elastic beam 500, and thereby, the displacements of the second movable member 381*c* and the third movable member 382*c* within the XY-plane may be further suppressed. Accordingly, stress concentration on the second supporting beam 371 and the third supporting beam 372 is reduced and the inertial sensor 1*c* with higher impact resistance is obtained. Particularly, when an excessive impact or the like is applied from outside, deformation energy is accumulated not only in the second supporting beam 371 and the third supporting beam 372 but also in the elastic beam 500, and the collision energy may be relaxed and stiction may be suppressed. Further, unnecessary vibration generated due to vibration of the second movable member 381c and the third movable member 382c is reduced, and thereby, the inertial sensor 1c that may accurately detect the acceleration Az is obtained.

It is preferable to set spring constants of the elastic beam 500 smaller in the Z-axis and larger in the X-axis. As described above, rigidity of the elastic beam 500 is set to be lower in the Z-axis and higher in the X-axis, and thereby, the displacement of the second movable member 381c and the third movable member 382c within the XY-plane may be further suppressed while the stopper function and the damper function by the second movable member 381c are maintained.

When the second movable member 381c vibrates around the rotation axis J2 and the third movable member 382c vibrates around the rotation axis J3, the vibration mode is separated into an in-phase mode and an out-of-phase mode. The resonance frequency in the in-phase mode of the second movable member 381c around the rotation axis J2 and the resonance frequency in the in-phase mode of the third movable member 382c around the rotation axis J3 are twice or more of the resonance frequency of the first movable member 31 around the rotation axis J1. The resonance frequency in the in-phase mode of the second movable member 381c around the rotation axis J2 and the resonance frequency in the in-phase mode of the third movable member 382c around the rotation axis J3 are set to be twice or more of the resonance frequency of the first movable member around the rotation axis J1, and thereby, when the acceleration Az in the Z-axis is detected, the second movable member 381c and the third movable member 382c may be regarded as being in a substantially stationary state relative to the first movable member 31. That is, the second movable member 381c and the third movable member 382c may be regarded as a single rigid body seesaw-swinging around the rotation axis J1 with the first movable member 31. The resonance frequency in the in-phase mode of the second movable member 381c around the rotation axis J2 and the resonance frequency in the in-phase mode of the third movable member 382c around the rotation axis J3 are set to be twice or more of the resonance frequency of the first movable member 31 around the rotation axis J1, and thereby, the acceleration Az may be detected in the state.

5. Embodiment 5

Figure 9:
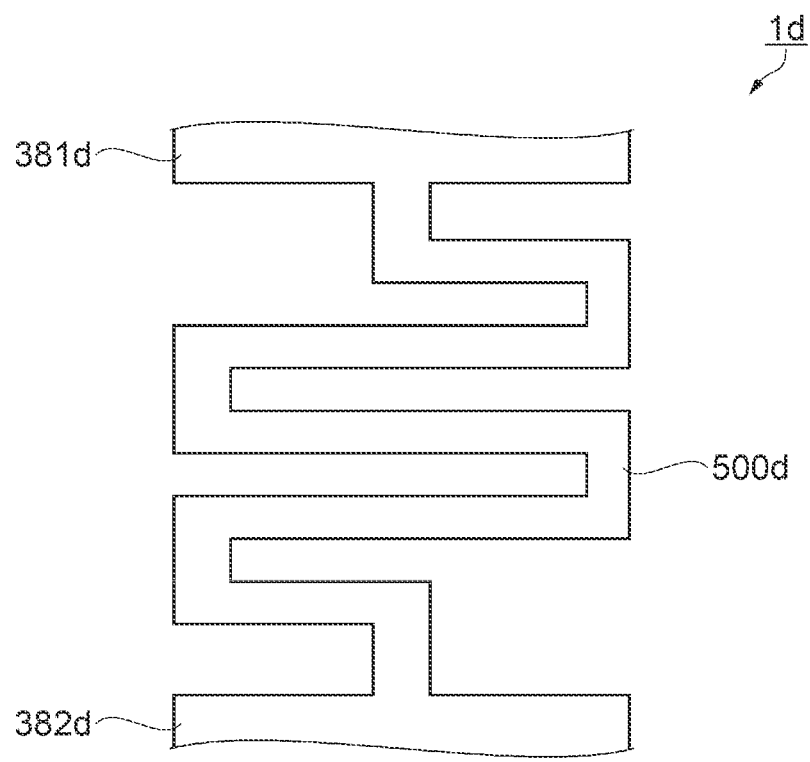
FIG. 9 is a plan view corresponding to a position of an F portion of an inertial sensor according to embodiment 5.

Next, an inertial sensor 1d according to embodiment will be explained with reference to FIG. 9. FIG. 9 corresponds to a plan view in the position of the F portion in FIG. 7.

The inertial sensor 1d of the embodiment is the same as the inertial sensor 1c of embodiment 4 except that a structure of an elastic beam 50d is different from the inertial sensor 1c of embodiment 4. The embodiment will be explained with a focus on the differences from the above described embodiment 4 and the explanation of the same items will be omitted.

In the embodiment, a second movable member 381d and a third movable member 382d line-symmetrically placed with respect to the center line L as an axis of symmetry and facing each other have an end part as a free end at a side of the second movable member 381d closer to the center line L and an end part as a free end at a side of the third movable member 382d closer to the center line L coupled by the elastic beam 500d. The elastic beam 500d is a folded spring.

The end part as the free end at the side of the second movable member 381d closer to the center line L and the end part as the free end at the side of the third movable member 382d closer to the center line L are coupled by the elastic beam 500d, and thereby, displacement of the second movable member 381d and the third movable member 382d within the XY-plane may be suppressed. When an excessive impact or the like is applied from outside, deformation energy is also accumulated in the elastic beam 500d, and the collision energy may be relaxed and stiction may be suppressed.

6. Embodiment 6

Figure 10:
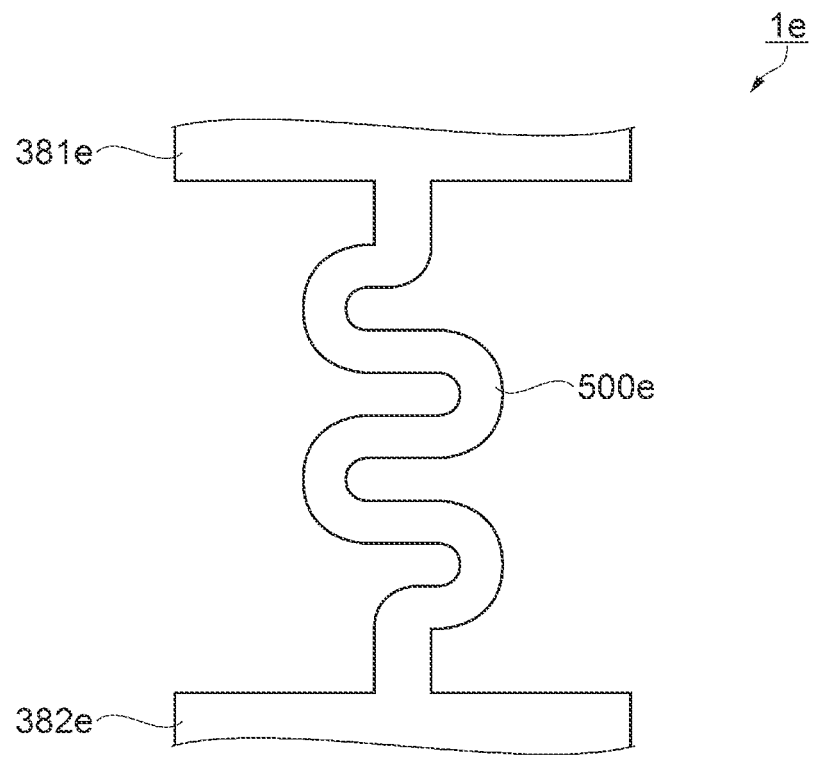
FIG. 10 is a plan view corresponding to a position of an F portion of an inertial sensor according to embodiment 6.

Next, an inertial sensor 1e according to embodiment will be explained with reference to FIG. 10. FIG. 10 corresponds to a plan view in the position of the F portion in FIG. 7.

The inertial sensor 1e of the embodiment is the same as the inertial sensor 1c of embodiment 4 except that a structure of an elastic beam 50e is different from the inertial sensor 1c of embodiment 4. The embodiment will be explained with a focus on the differences from the above described embodiment 4 and the explanation of the same items will be omitted.

In the embodiment, a second movable member 381e and a third movable member 382e line-symmetrically placed with respect to the center line L as an axis of symmetry and facing each other have an end part as a free end at a side of the second movable member 381e closer to the center line L and an end part as a free end at a side of the third movable member 382e closer to the center line L coupled by the elastic beam 500e. The elastic beam 500e is a bellows-shaped or meander-shaped spring.

The end part as the free end at the side of the second movable member 381e closer to the center line L and the end part as the free end at the side of the third movable member 382e closer to the center line L are coupled by the elastic beam 500e, and thereby, displacement of the second movable member 381e and the third movable member 382e within the XY-plane may be suppressed. When an excessive impact or the like is applied from outside, deformation energy is also accumulated in the elastic beam 500e, and the collision energy may be relaxed and stiction may be suppressed.

7. Embodiment 7

Figure 11:
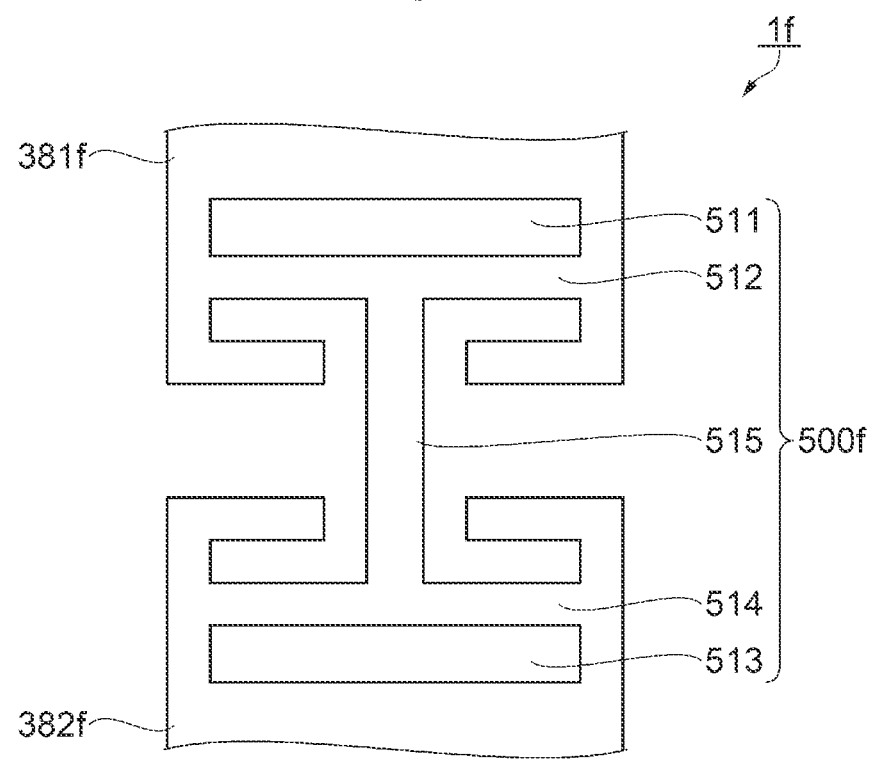
FIG. 11 is a plan view corresponding to a position of an F portion of an inertial sensor according to embodiment 7.

Next, an inertial sensor 1f according to embodiment will be explained with reference to FIG. 11. FIG. 11 corresponds to a plan view in the position of the F portion in FIG. 7.

The inertial sensor 1f of the embodiment is the same as the inertial sensor 1c of embodiment 4 except that a structure of an elastic beam 50f is different from the inertial sensor 1c of embodiment 4. The embodiment will be explained with a focus on the differences from the above described embodiment 4 and the explanation of the same items will be omitted.

In the embodiment, a second movable member 381f and a third movable member 382f line-symmetrically placed with respect to the center line L as an axis of symmetry and facing each other have an end part as a free end at a side of the second movable member 381f closer to the center line L and an end part as a free end at a side of the third movable member 382f closer to the center line L coupled by the elastic beam 500f.

The second movable member 381f has a through hole 511 in the end part as the free end of the second movable member 381f, and the through hole 511 has a side wall 512 at the side facing the third movable member 382f, i.e., the side closer to the center line L. The third movable member 382f has a through hole 513 in the end part as the free end of the third movable member 382f, and the through hole 513 has a side wall 514 at the side facing the second movable member 381f, i.e., the side closer to the center line L. Between the side wall 512 of the second movable member 381f and the side wall 514 of the third movable member 382f, a coupling beam 515 extending from the side wall 512 toward the side wall 514 respectively couples to the side wall 512 and the side wall 514. The elastic beam 500f includes the side wall 512, the side wall 514, and the coupling beam 515, and functions as a spring by respective flexure of the side wall 512, the side wall 514, and the coupling beam 515.

The end part as the free end at the side of the second movable member 381f closer to the center line L and the end part as the free end at the side of the third movable member 382f closer to the center line L are coupled by the elastic beam 500f, and thereby, displacement of the second movable member 381f and the third movable member 382f within the XY-plane may be suppressed. When an excessive impact or the like is applied from outside, deformation energy is also accumulated in the elastic beam 500f, and the collision energy may be relaxed and stiction may be suppressed.

8. Embodiment 8

Next, an inertial measurement unit 2000 will be explained as an example of an electronic apparatus including the inertial sensors 1 to 1f according to embodiment 8 with reference to FIGS. 12 and 13. In the following description, a configuration to which the inertial sensor 1 is applied will be exemplified for explanation.

Figure 12:
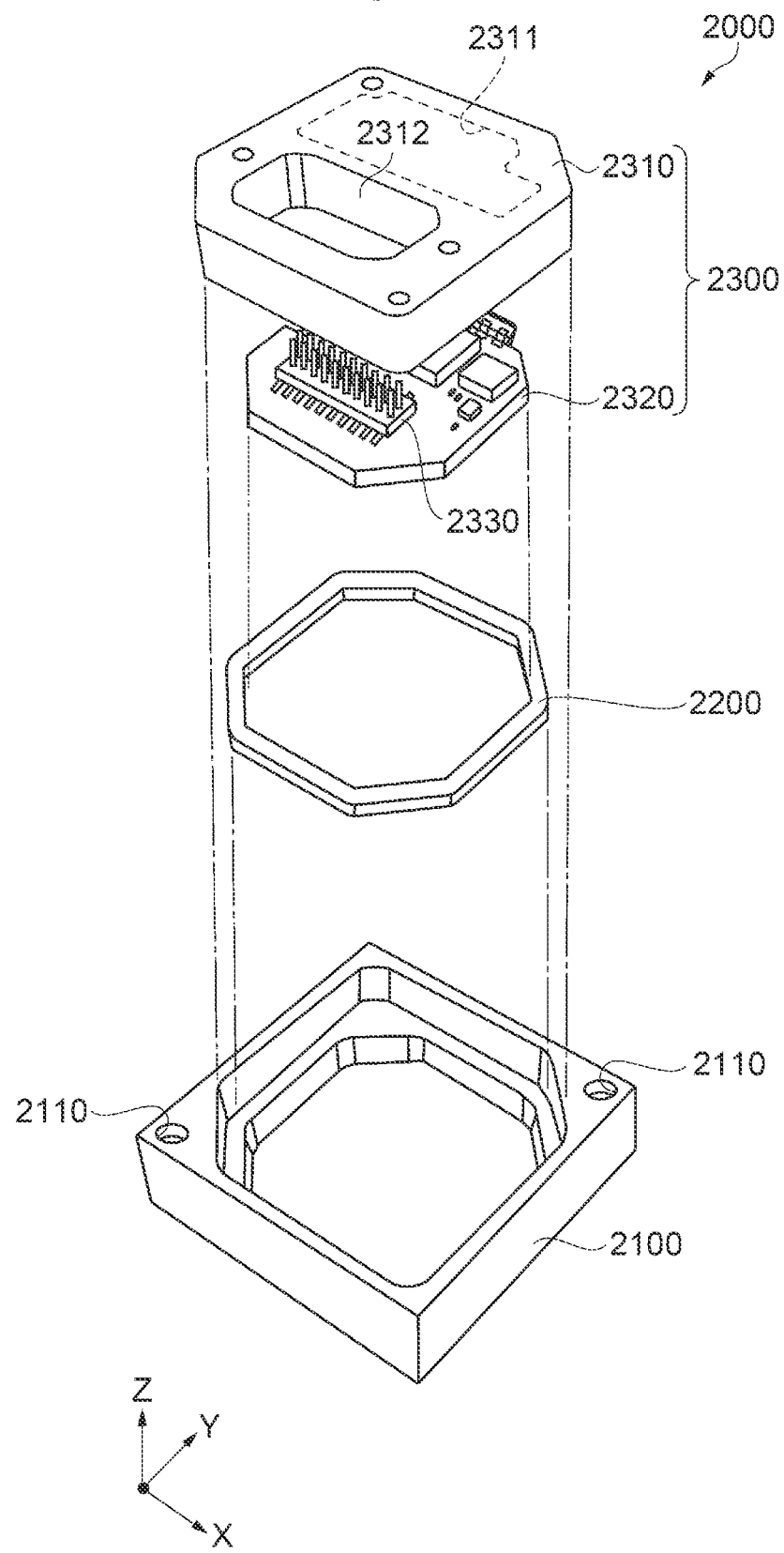
FIG. 12 is an exploded perspective view showing a schematic configuration of an inertial measurement unit according to embodiment 8.

The inertial measurement unit 2000 (IMU) shown in FIG. 12 is an apparatus that detects inertial momentum including an attitude and a behavior of a moving body such as an automobile or robot. The inertial measurement unit 2000 functions as the so-called six-axis motion sensor including an acceleration sensor that detects accelerations Ax, Ay, Az in the three axes and angular velocity sensors that detect angular velocities ωx, ωy, ωz around the three axes.

The inertial measurement unit 2000 is a rectangular parallelepiped having a substantially square planar shape. Screw holes 2110 as fixing members are formed near two vertices located in a diagonal line of the square. Two screws are inserted through the two screw holes 2110 and the inertial measurement unit 2000 may be fixed to an attached surface of an attached body such as an automobile. Note that, by selection and design change of components, the unit may be downsized into a size that can be provided in e.g. a smartphone or digital camera.

The inertial measurement unit 2000 has an outer case 2100, a joining member 2200, and a sensor module 2300, and the sensor module 2300 is inserted into the outer case 2100 via the joining member 2200. Further, the sensor module 2300 has an inner case 2310 and a substrate 2320.

The outer shape of the outer case 2100 is a rectangular parallelepiped having a substantially square planar shape like the overall shape of the inertial measurement unit 2000, and screw holes 2110 are respectively formed near two vertices located in a diagonal line of the square. Further, the outer case 2100 has a box shape and the sensor module 2300 is housed inside.

The inner case 2310 is a member that supports the substrate 2320 and has a shape fitted inside of the outer case 2100. Further, in the inner case 2310, a concave portion 2311 for preventing contact with the substrate 2320 and an opening 2312 for exposure of a connector 2330, which will be described later, are formed. The inner case 2310 is joined to the outer case 2100 via the joining member 2200. The substrate 2320 is joined to the lower surface of the inner case 2310 via an adhesive.

Figure 13:
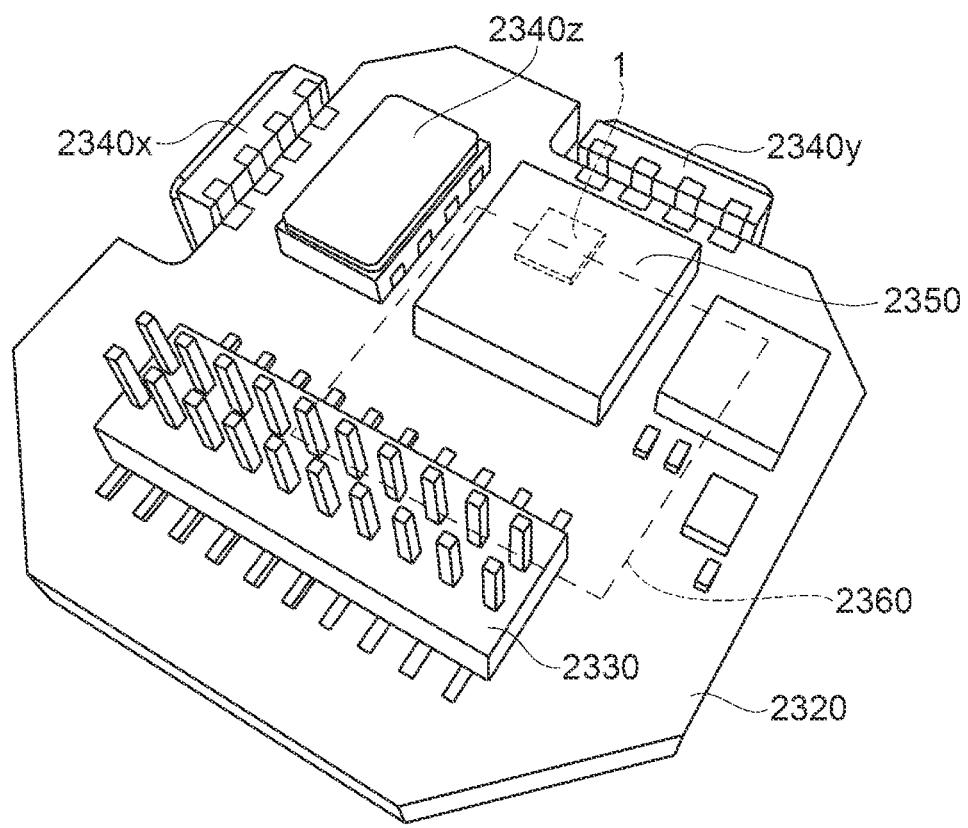
FIG. 13 is a perspective view of a substrate in FIG. 12.

As shown in FIG. 13, the connector 2330, an angular velocity sensor 2340z that detects the angular velocity around the Z-axis, an acceleration sensor unit 2350 that detects accelerations in the respective axis of the X-axis, the Y-axis, and the Z-axis, etc. are mounted on the upper surface of the substrate 2320. An angular velocity sensor 2340x that detects the angular velocity around the X-axis and an angular velocity sensor 2340y that detects the angular velocity around the Y-axis are mounted on the side surfaces of the substrate 2320.

The acceleration sensor unit 2350 includes at least above described inertial sensor 1 for measurement of the acceleration in the Z-axis, and may detect an acceleration in one axis or accelerations in two or three axes as necessary. Note that the angular velocity sensors 2340x, 2340y, 2340z are not particularly limited, but e.g. vibration gyro sensors using Coriolis force may be used.

A control IC 2360 is mounted on the lower surface of the substrate 2320. The control IC 2360 as a control unit that performs control based on a detection signal output from the inertial sensor 1 is an MCU (Micro Controller Unit), contains a memory unit including a non-volatile memory and an A/D converter, and controls the respective parts of the inertial measurement unit 2000. In the memory unit, programs for specifying sequences and contents for detection of the accelerations and the angular velocities, programs for digitalizing and incorporating detection data into packet data, incident data, etc. are stored. Note that other electronic components are mounted on the substrate 2320.

The inertial measurement unit 2000 uses the acceleration sensor unit 2350 containing the inertial sensor 1, and the inertial measurement unit 2000 having high impact resistance and high reliability is obtained.

9. Embodiment 9

Next, a smartphone 1200 will be explained as an example of the electronic apparatus including the inertial sensors 1 to 1f according to embodiment 9. In the following description, a configuration to which the inertial sensor 1 is applied will be exemplified for explanation.

Figure 14:
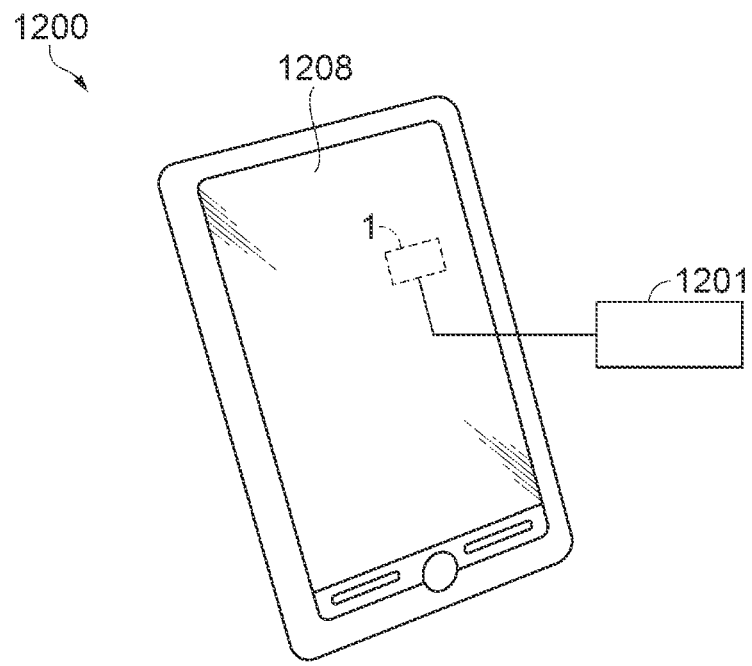
FIG. 14 is a perspective view showing a cellular phone as an example of an electronic apparatus according to embodiment 9.

As shown in FIG. 14, the above described inertial sensor 1 is incorporated in the smartphone 1200 as the electronic apparatus. Detection data as a detection signal of an acceleration or the like detected by the inertial sensor 1 is transmitted to a control unit 1201 of the smartphone 1200. The control unit 1201 includes a CPU (Central Processing Unit) and may recognize the attitude and behavior of the smartphone 1200 from the received detection data to change a display image displayed on a display unit 1208, emit a warning sound or sound effect, and vibrate the main body by driving a vibration motor. In other words, the control unit may perform motion sensing of the smartphone 1200 to change the display content and generate sound, vibration, etc. from the measured attitude and behavior. Particularly, when a game application is executed, realistic sensations close to reality may be provided.

The inertial sensors 1 to 1f may be applied not only to the above described smartphone 1200 but also to e.g. a personal computer, digital still camera, tablet terminal, timepiece, smartwatch, inkjet printer, laptop personal computer, television, wearable terminal such as smart glasses or HMD (head mounted display), video camera, video tape recorder, car navigation system, dashboard camera, pager, personal digital assistance, electronic dictionary, electronic translator, calculator, electronic game machine, toy, word processor, work station, videophone, security television monitor, electronic binoculars, POS terminal, medical apparatus, fish finder, various measurement instruments, mobile terminal base station device, various meters and gauges for vehicles, railcars, airplanes, helicopters, and ships, flight simulator, network server, etc.

10. Embodiment 10

Next, an automobile 1500 will be explained as an example of a vehicle including the inertial sensors 1 to 1f according to embodiment 10. In the following description, a configuration to which the inertial sensor 1 is applied will be exemplified for explanation.

Figure 15:
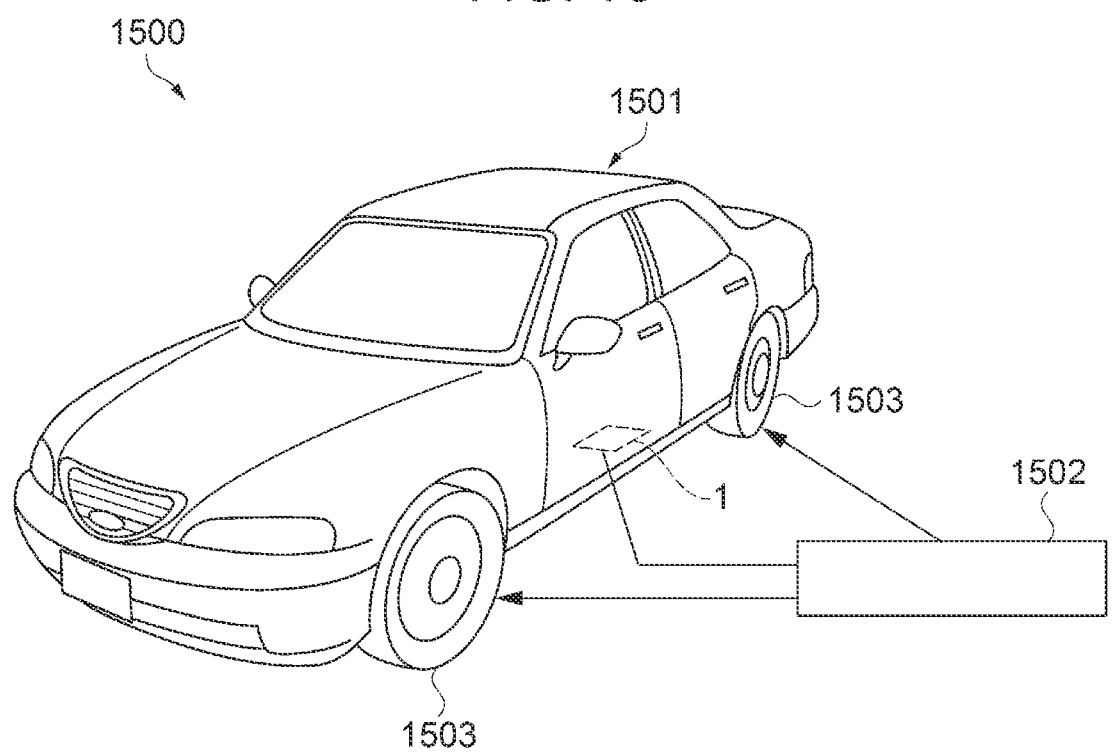
FIG. 15 is a perspective view showing an automobile as an example of a vehicle according to embodiment 10.

The automobile 1500 as the vehicle contains the inertial sensor 1 as shown in FIG. 15, and may detect e.g. a movement and an attitude of a vehicle body 1501 by the inertial sensor 1. The detection signal of the inertial sensor 1 is supplied to a vehicle attitude controller 1502 as a control unit that controls the movement and the attitude of the vehicle body 1501, and the vehicle attitude controller 1502 may detect the attitude of the vehicle body 1501 based on the signal, control hardness0 of the suspension according to a detection result, and control brakes of individual wheels 1503.

The inertial sensors 1 to 1f may be widely applied to a keyless entry system, immobilizer, car navigation system, car air-conditioner, antilock brake system (ABS), airbag, tire pressure monitoring system (TPMS), engine control system (engine system), control equipment for automated driving inertial navigation, electronic control unit (ECU) of battery monitor for hybrid car or electric car, etc.

In addition to the above described exemplifications, the inertial sensors 1 to 1f may be used in e.g. movement and attitude control for a bipedal robot or electric train, remote control for a radio-controlled airplane, radio-controlled helicopter, and drone or movement and attitude control for an autonomous flight vehicle, movement and attitude control for an agricultural machine or construction machine, and control for a rocket, artificial satellite, ship, and automated guided vehicle (AGV).

What is claimed is:

1. An inertial sensor comprising:
   a substrate;
   a first movable member placed on one surface of the substrate, including a first rotation axis extending along a first direction, and being swingable around the first rotation axis;
   a first supporting beam supporting the first movable member as the first rotation axis;
   a second movable member including a second rotation axis extending along a second direction crossing the first direction and being swingable around the second rotation axis;
   a second supporting beam coupling the first movable member and the second movable member and supporting the second movable member as the second rotation axis;
   a third movable member including a third rotation axis in the second direction crossing the first direction and being swingable around the third rotation axis;
   a third supporting beam coupling the first movable member and the third movable member and supporting the third movable member as the third rotation axis; and
   a projection provided on the substrate or the second movable member and the third movable member, overlapping with the second movable member and the third movable member in a plan view from third direction crossing the first direction and the second direction, and projecting toward the second movable member and the third movable member or the substrate, wherein
   the second movable member and the third movable member are line-symmetrically placed with respect to a center line of the first movable member along the second direction as an axis of symmetry,
   a center of gravity of the second movable member is closer to the center line than the second supporting beam, and
   a center of gravity of the third movable member is closer to the center line than the third supporting beam,
   wherein the second supporting beam and the third supporting beam have higher torsional rigidity than the first supporting beam.

2. The inertial sensor according to claim 1, wherein respective free ends at sides closer to the center line of the second movable member and the third movable member are coupled by an elastic beam.

3. The inertial sensor according to claim 1, wherein
   a resonance frequency of the second movable member around the second rotation axis is twice or more of a resonance frequency of the first movable member around the first rotation axis, and
   a resonance frequency of the third movable member around the third rotation axis is twice or more of the resonance frequency of the first movable member around the first rotation axis.

4. The inertial sensor according to claim 1, wherein resonance frequencies in an in-phase mode of the second movable member and the third movable member around the second rotation axis or the third rotation axis are twice or more of a resonance frequency of the first movable member around the first rotation axis.

5. An electronic apparatus comprising:
   the inertial sensor according to claim 1; and
   a control unit that performs control based on a detection signal output from the inertial sensor.

6. A vehicle comprising:
   the inertial sensor according to claim 1; and
   a control unit that performs control based on a detection signal output from the inertial sensor.

7. An inertial sensor comprising:
   a substrate;
   a first movable member placed on one surface of the substrate, including a first rotation axis extending along a first direction, and being swingable around the first rotation axis;
   a first supporting beam supporting the first movable member as the first rotation axis;
   a second movable member including a second rotation axis along a second direction crossing the first direction and being swingable around the second rotation axis;
   a second supporting beam coupling the first movable member and the second movable member and supporting the second movable member as the second rotation axis;
   a third movable member including a third rotation axis in the second direction crossing the first direction and being swingable around the third rotation axis;
   a third supporting beam coupling the first movable member and the third movable member and supporting the third movable member as the third rotation axis; and a projection provided on the substrate, overlapping with the second movable member and the third movable member in a plan view from a third direction crossing the first direction and the second direction, and projecting toward the second movable member and the third movable member, wherein the second movable member and the third movable member are line-symmetrically placed with respect to a center line of the first movable member along the second direction as an axis of symmetry, a center of gravity of the second movable member is closer to the center line than the second supporting beam, a center of gravity of the third movable member is closer to the center line than the third supporting beam, and the second supporting beam and the third supporting beam have higher torsional rigidity than the first supporting beam.

* * * * *